United States Patent [19]
Cramer et al.

[11] Patent Number: 5,946,685
[45] Date of Patent: Aug. 31, 1999

[54] GLOBAL MOUNT MECHANISM USED IN MAINTAINING A GLOBAL NAME SPACE UTILIZING A DISTRIBUTED LOCKING MECHANISM

[75] Inventors: Samuel M. Cramer, Mountain View; Glenn C. Skinner, Palo Alto, both of Calif.

[73] Assignee: Sun Microsystems, Inc., Palo Alto, Calif.

[21] Appl. No.: 08/884,252

[22] Filed: Jun. 27, 1997

[51] Int. Cl.⁶ ................................................. G06F 17/30
[52] U.S. Cl. .................... 707/10; 707/1; 707/8; 707/101; 707/200
[58] Field of Search .................. 707/1, 2, 8, 10, 707/100, 101, 102, 103, 200, 201, 202, 203, 204, 205; 395/200.31, 200.48, 200.49, 200.47, 712

[56] References Cited

U.S. PATENT DOCUMENTS

| | | | |
|---|---|---|---|
| 5,151,989 | 9/1992 | Johnson et al. | 707/10 |
| 5,202,971 | 4/1993 | Henson et al. | 707/8 |
| 5,623,666 | 4/1997 | Pike et al. | 707/200 |
| 5,689,706 | 11/1997 | Rao et al. | 707/102 |
| 5,701,462 | 12/1997 | Whitney et al. | 707/10 |
| 5,761,498 | 6/1998 | Ooe et al. | 707/10 |
| 5,778,168 | 7/1998 | Fuller | 395/182.16 |

OTHER PUBLICATIONS

Microsoft "Microsoft Windows NT Server Cluster Strategy: High Availability and Scalability With Industry-StandardHardware" (Microsoft, Business Systems Division White Paper).

Herman C Rao, Towards a national collaboratory: an internet file system, IEEE 1992, and 489–498, Jun. 1992.

Herman C Rao et al., Accessing files in an Internet: the Jade file system, IEEE 1993, and 613–624, Jun. 1993.

Herman Chung–Hwa Rao, Distributed application framework for large scale distributed systems, IEEE 1993 and 31–38, Jun. 1993.

Stuart Sechrest et al., Blending Hierarchical and attribute–based file naming, IEEE 1992, and 572–580, Jun. 1992.

*Primary Examiner*—Wayne Amsbury
*Assistant Examiner*—Srirama Channavajjala
*Attorney, Agent, or Firm*—Gary S. Williams; Pennie & Edmonds LLP

[57] ABSTRACT

A global mount mechanism capable of maintaining a consistent global name space in a distributed computing system including a plurality of nodes interconnected by a communications link is herein disclosed. The global mount mechanism mounts a new file system resource into the global name space in a coherent manner such that the new file system resource is mounted at the same mount point concurrently in each node. The global mount mechanism accommodates mount or unmount requests initiated from a requesting node for a resource located in a remote node. The global mount mechanism is also used to unmount a file system resource from the global name space. The global mount mechanism also includes an initialization procedure that is used to generate the global name space initially by providing each local mount point with a global locking capability.

24 Claims, 17 Drawing Sheets

# GLOBAL MOUNT MECHANISM USED IN MAINTAINING A GLOBAL NAME SPACE UTILIZING A DISTRIBUTED LOCKING MECHANISM

The present invention relates generally to a distributed file system and particularly to a method and system for maintaining a global name space in a distributed file system.

BACKGROUND OF THE INVENTION

A cluster is a group of independent computing nodes connected by a high-speed communications link. Each computing node has one or more processes where each process has its own address space. Each process can access data that is associated with a file system that exists in the cluster. The file system can be resident in the node associated with the process or in another node within the cluster.

The cluster has a global name space which represents the file systems accessible to each node within the cluster. Each node may also have a local name space representing the file systems accessible to processes associated with a particular node. A user associated with a particular node can mount or connect a file system local to one node into the global name space. Furthermore, a user can unmount or disconnect a file system from the global name space thereby making the file system inaccessible to each node in the cluster.

It is beneficial for each node to have a single system image of the global name space. However, maintaining this image is complicated by issues of coherency, resource location, and transparency. Coherency must be achieved in mounting and unmounting a file system at the same mount point within the cluster and at the same point in time. Otherwise, each node can mount a file system at a different mount point or access an unmounted file.

From the view point of users issuing mount and unmount commands, the existence of the global name space should be as transparent as possible. This transparency will minimize the changes required to the interface of the mount and unmount command as well as to user application programs and data.

Furthermore, in some instances the resources needed to mount a file system are not always accessible from all nodes in the cluster. This can affect the mount of a file system initiated from one node when the resources associated with the file system are best accessed from another node. In order to perform the mount task, it becomes necessary to overcome this obstacle.

Accordingly, there exists a need to maintain a global name space in a distributed computing environment in a manner that accounts for the aforementioned constraints.

SUMMARY OF THE INVENTION

The method and system of the present invention pertains to a global mount mechanism capable of maintaining a consistent global name space in a distributed computing system. The distributed computing system includes a cluster of nodes interconnected by a communications link. The global mount mechanism mounts a new file system resource into the global name space and unmounts a mounted file system resource in a coherent manner. Coherency is achieved by mounting the file system resource at the same mount point within the cluster and at the same point in time. The global mount mechanism utilizes a distributed locking mechanism to ensure that the mount or unmount operation is performed in a coherent manner. The global mount mechanism accounts for the disparity in file system resource distribution by allowing a file system resource to be mounted by a node not associated with the file system resource.

The global name space is a collection of file system resources that are accessible from each node in the cluster. Each file system resource mediates access to a set of file resources belonging to its associated file system resource. Each file resource is represented by a pathname that can include one or more directories. Each directory in the global name space can serve as a global mount point at which a new file system resource can be mounted or incorporated into the global name space. When a new file system resource is mounted at a particular mount point, the file resources it mediates become accessible through pathnames that start with the mount point's pathname.

A server node that is associated with a file system resource includes a virtual file system (VFS) mechanism and a file system object (FSobj) to represent the file system resource. In addition, each client node includes a proxy VFS mechanism and proxy FSobj to represent the file system resource.

A virtual file system node (vnode) mechanism is used to represent each directory in the global name space. The vnode mechanism is used as a mount point at which a VFS or proxy VFS mechanism is attached thereby incorporating the new file system resource into the global name space.

The global mount mechanism includes an initialization mechanism that generates the global name space initially. A system initialization, each node has a local name space including a number of local file system resources that are only accessible from within the node. The initialization mechanism gives one or more local directories or local mount points a global locking capability that enables the local mount to be locked by any node in the cluster. The global locking capability turns the local mount point into a global mount point that is part of the global name space. One or more local file system resources can then be mounted at a global mount point and, hence, become part of the global name space.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Overview of the File System Data Structures

Figure 1:
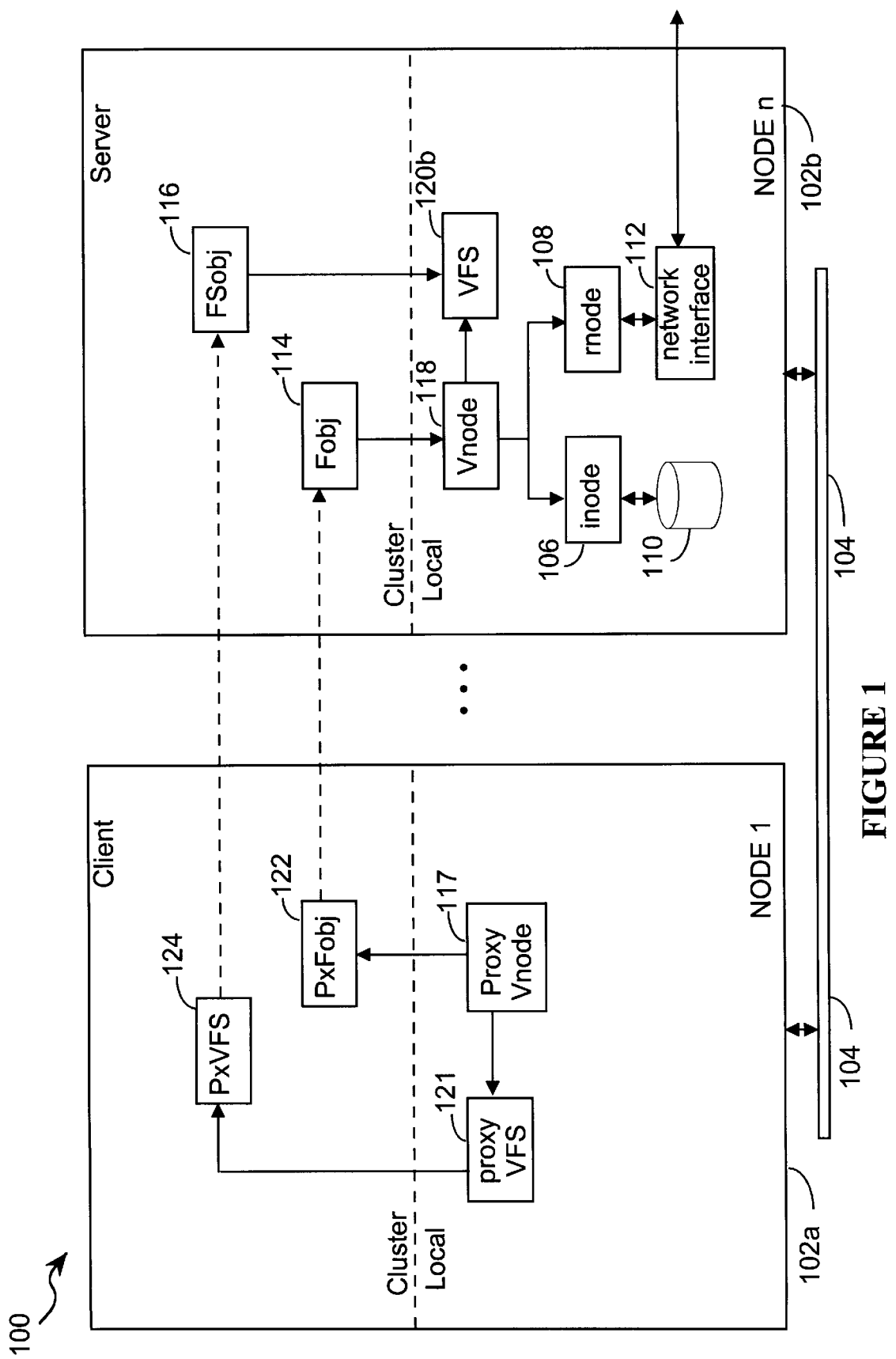
FIG. 1 is a block diagram of a distributed computing system incorporating the preferred embodiments of the present invention.

Referring to FIG. 1, there is shown a distributed computing system 100 including a plurality of computing nodes 102. Each computing node 102 represents an independent client/server computer that is interconnected via communications link 104. Each node can act as either a client or a server computer or both. With respect to a given file system resource, one node can act as the server computer for the resource and other nodes as client computers. A client computer is associated with a node that accesses file system resources over the communication link and a server computer is associated with a node that provides file system resources over the communication link. However, the classification of a client and server computer for a particular file system resource can vary over time.

The distributed computing system 100 utilizes a distributed file system that includes a local layer (Local) and a cluster layer (Cluster). The local layer includes a physical file system and a vnode/VFS interface. The physical file system is any file system that stores file data on a data storage device that is local to the node. Examples of physical file systems can include but are not limited to the MSDOS PC file system, the 4.3BSD file system, the Sun network file system (NFS), and the like.

The vnode/VFS interface is an interface between the operating system and the physical file system. The vnode/VFS interface accommodates multiple file system implementations within any Unix operating system or kernel. A file system can be incorporated into the kernel through the vnode/VFS interface. A vnode (i.e., virtual file node) 118 is a data structure that contains operating system data describing a particular file. A virtual system (VFS) 120 is a data structure that contains operating system data describing a particular file system.

The cluster layer represents the file system resources that are accessible from any node within the cluster. It should be noted that the term "file system resource" as used herein represents information need to characterize a set of files, a file system, a directory or a group of directories. In addition, a directory can be considered a file. In the cluster file layer, each file system resource is represented as an object. A server node 120b will have a file system object (FSobj) 116 for each file system resource or file system under its control and a file object (Fobj) 114 for each directory that is under the server node's control. A client node 102a will have a proxy file object (PxFobj) 122 for each file that is accessed from a remote node and a proxy file system object (PxVFS) 124 for each file system or resource that is accessed from a remote node. In the case where the client and server computer are the same node, the client node 102a will have a file system object (FSobj) 116 and a file object (Fobj) 114 for a file system resource when the client node 102a is acting as the sever for the file system resource and will have proxy data structures when the client node 102a is acting as a client for the resource. The proxy file object 122 contains an object reference to the associated file object 114 and the proxy file system object 122 contains an object reference to the associated file system object 116.

The client and server communicate through remote procedure calls (RPCs). One or more threads associated with a client node can access a remote file system resource through a remote object invocation using the proxy object reference in a RPC. A more detailed description pertaining to the implementation of the remote object invocation can be found in U.S. patent application, Ser. No. 08/879,150, entitled "A System and Method for Remote Object Invocation," filed Jun. 19, 1997, and assigned to Sun Microsystems Inc., which is hereby incorporated by reference in its entirety as background information.

The cluster layer represents the global name space. In addition, each node has a local name space representing file systems or resources that are locally accessible only to that node. A node can incorporate one or more file systems into the global name space with the mount command and can remove file systems from the global name space with the unmount command. A more detailed description of the vnode and VFS interfaces can be found in Kleiman, Steven R., "Vnodes: An Architecture for Multiple File System Types in Sun UNIX," *Proceedings of the Summer* 1986 *USENIX Conference*, Atlanta, 1986.

FIG. 1 illustrates the aforementioned infrastructure of the local and cluster layers for an examplary file system containing a root directory and the file myfile.c as shown below.

/(root directory)

myfile.c

The local layer of the distributed file system on the sever node 102b includes a vnode 118 representing the file myfile.c. Each node contains reference to data that is specific to the kind of file system that it represents (i.e., file system specific data). A vnode contains one such reference. These references can vary. In FIG. 1, there are shown two such references 106, 108 and it should be noted that the two references are shown for illustration purposes only.

For example, vnode 18 can represent a file in a UFS file system. In this case, the vnode 118 contains a reference to an inode 106 that holds particular information on the file's representation on the data storage medium. A inode 106 is used to represent a Unix File System (UFS) file and is linked to the associated data storage medium 110 that stores the file. Further, vnode 118 can represent a NFS file system. In this case, the vnode 118 contains a reference to a mode 108 that represents a Network File System (NFS) file. The rnode 108 is linked to a network interface 112 that is used to access the remote data storage medium containing the file. However, it should be noted that the present invention is not limited to UFS or NFS file systems and other types of file systems can be used in this context as well.

Alternatively, a vnode 117 can represent a remote file system resource where the file system specific data is a proxy object reference (PxFobj) that refers to vnode 118. From the viewpoint of the operating system running on node 102a, there is no difference between vnode 117 or any other vnode 118 existing on that node. The operating system accesses each vnode in the same manner.

The vnode 118 is linked to a VFS 120 that represents the overall file system. A VFS 120, 121 represents the overall file system. Each VFS 120, 121 contains a reference to data that is specific to the kind of file system that it represents (i.e., file system specific data). For example, VFS 120 represents a particular file system and contains a reference to the file system specific data (not shown). Proxy VFS 121 represents a remote file system resource and its file system specific data is a proxy object reference (PxVFS) 124 that refers to FSobj 116. From the point of view of the operating system running on node 102a, there is no difference between proxy VFS 121 or any other VFS 120 existing on that node. The operating system accesses each VFS in the same manner.

It should be noted that from the client node's viewpoint, the proxy file system is just another file system type on par with an NFS or UFS file system. However, internally it operates by pairing proxy vnodes 117 on each client node with corresponding vnodes 118 on the server node. The file system specific data for the proxy file system (i.e., the PxFobj and the PxVFS) contains the linkage information required to maintain the association with the corresponding server node.

A more detailed description of the proxy file system can be found in Matena, et al., "Solaris MC File System Framework," Sun Microsystems Laboratories Technical Report SMLI TR-96-57, October 1996 which is hereby incorporated by reference as background information.

The sever-side cluster layer of the file system includes a file object (Fobj) 114 representing the file, myfile.c. The Fobj 114 is linked to the vnode 118 associated with the file. In addition, there is a file system object (FSobj) 116 representing the file system as a whole.

The client-side local layer of the file system includes a proxy vnode 117 representing myfile.c. The proxy vnode 117 is linked to a VFS 121 representing the file system associated with myfile.c.

The proxy vnode 117 is linked to a proxy file object (PxFobj) 122 which contains a reference to the associated Fobj 114 for myfile.c. The PxFobj 122 is associated with the cluster layer of the file system. The client node 102a can access the file myfile.c through a RPC utilizing the object reference contained in PxFobj 122. In addition, the VFS 121 is linked to a PxVFS 124 which contains a reference to the file system object FSobj 116 representing the file system. The client node can access the file system object through a RPC utilizing the object reference in PxVFS 124.

The aforementioned description details some of the data structures used to support the distributed file system in the cluster environment of the present invention. A global mount mechanism is provided that utilizes these data structures as well as additional procedures and data structures to maintain a global name space for each node in the cluster. A brief synopsis of the global mount mechanism is shown in FIGS. 2A–2B and 3A–3B.

Figure 2A:
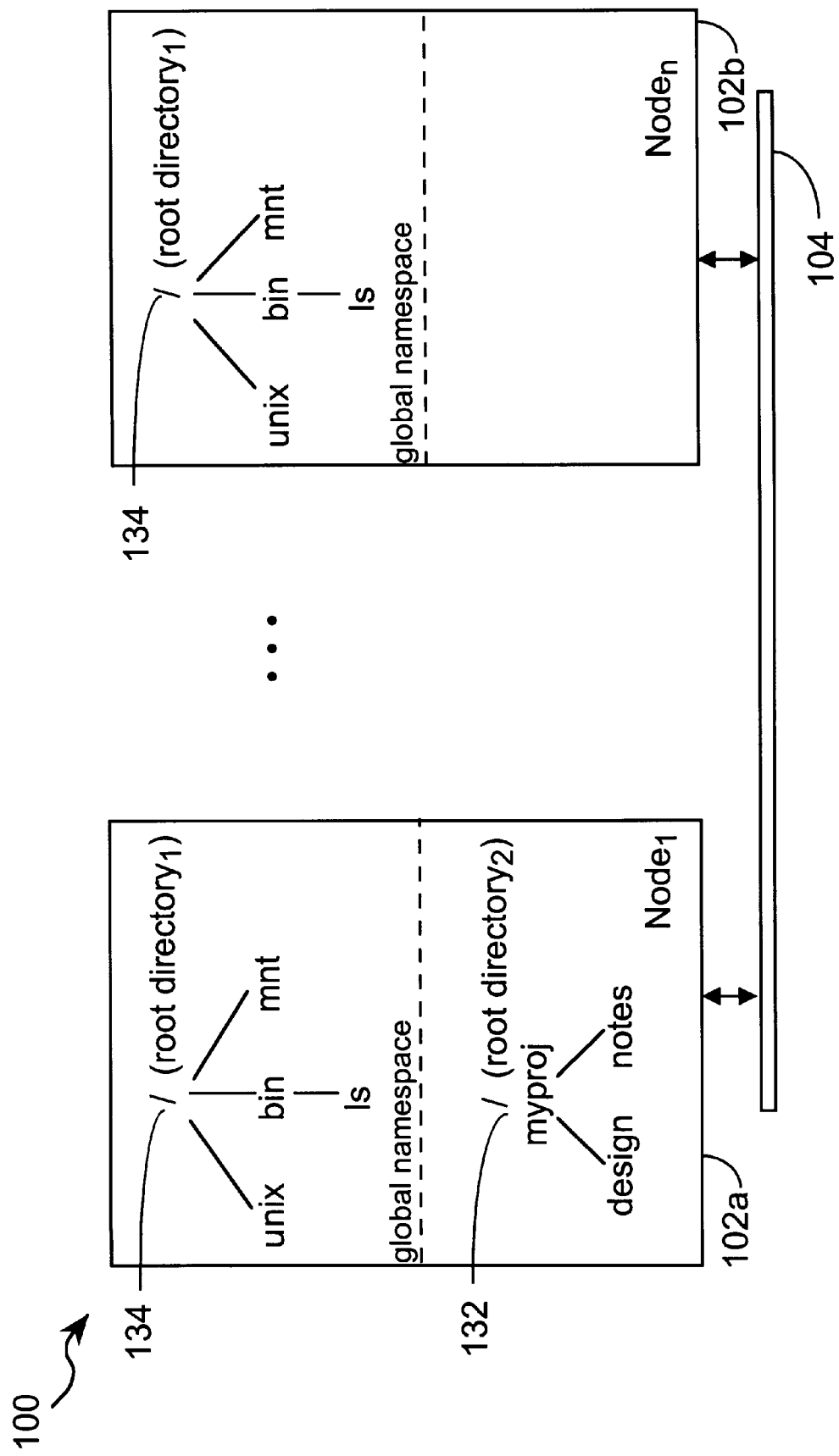
FIG. 2A represents an exemplary global name space and a file system that will be mounted into the global name space.
Figure 2B:
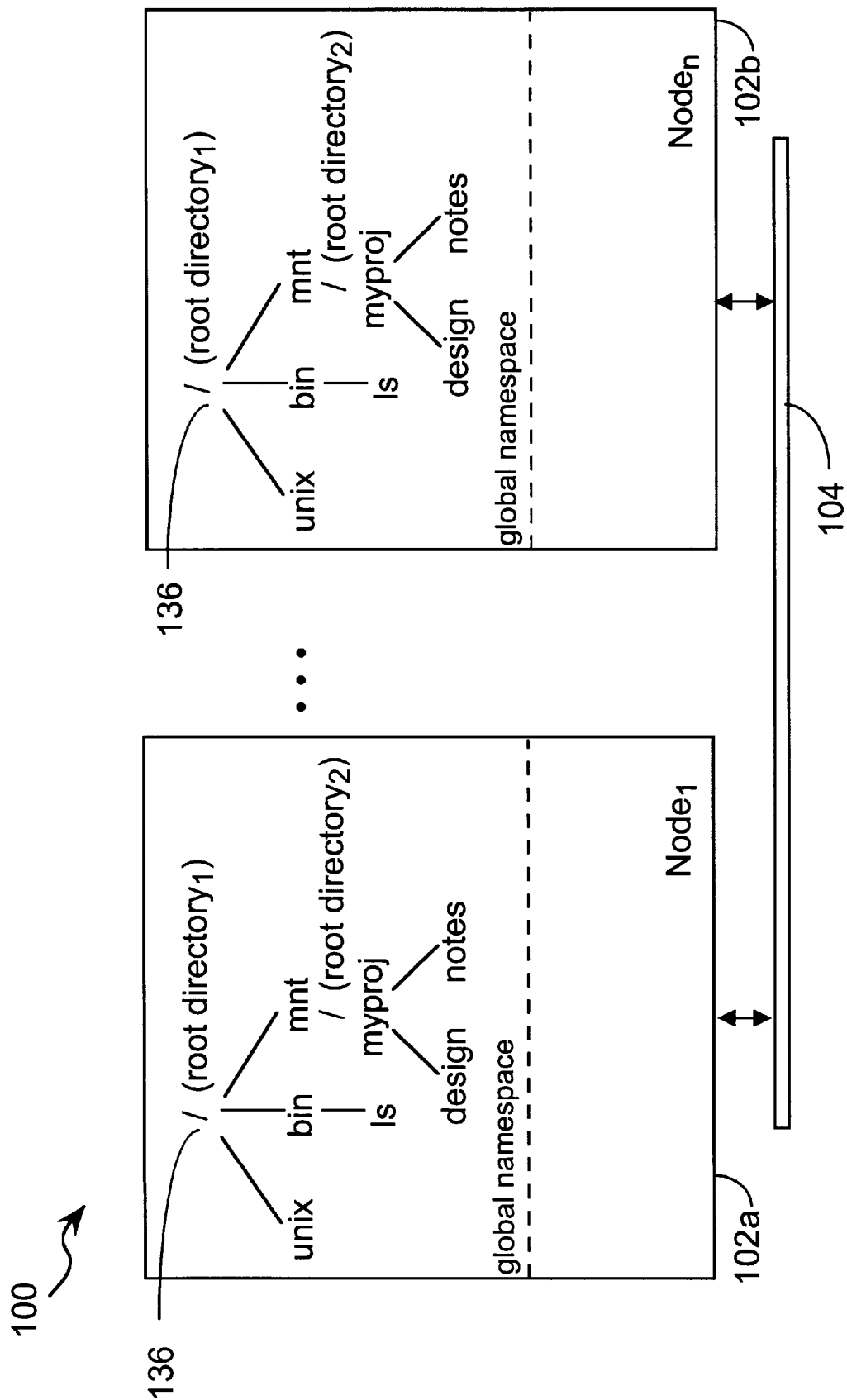
FIG. 2B represents the global name space of FIG. 2A after the mount of the file system is performed.

FIGS. 2A–2B illustrate a global name space 134 associated with each node 102 in the cluster. The global name space is a collection of file system resources, each containing a set of file where each file is represented by a pathname. The pathname can include one or more directories that are organized in a hierarchical structure. Each directory can serve as a mount point for incorporating a new file system resource into the global name space.

In this example, there is a file system 132 associated with a first node 102a that will be mounted into the global name space 134. At the completion of the global mount, the global name space 134 will appear as the single image shown in FIG. 2B. In order for the global name space to appear as a single image, the file system is mounted into the global name space at the same mount point in each node concurrently. In FIG. 2B, the common mount point is /mnt to which the file system 132 with root directory$_2$ is mounted.

Figure 3A:
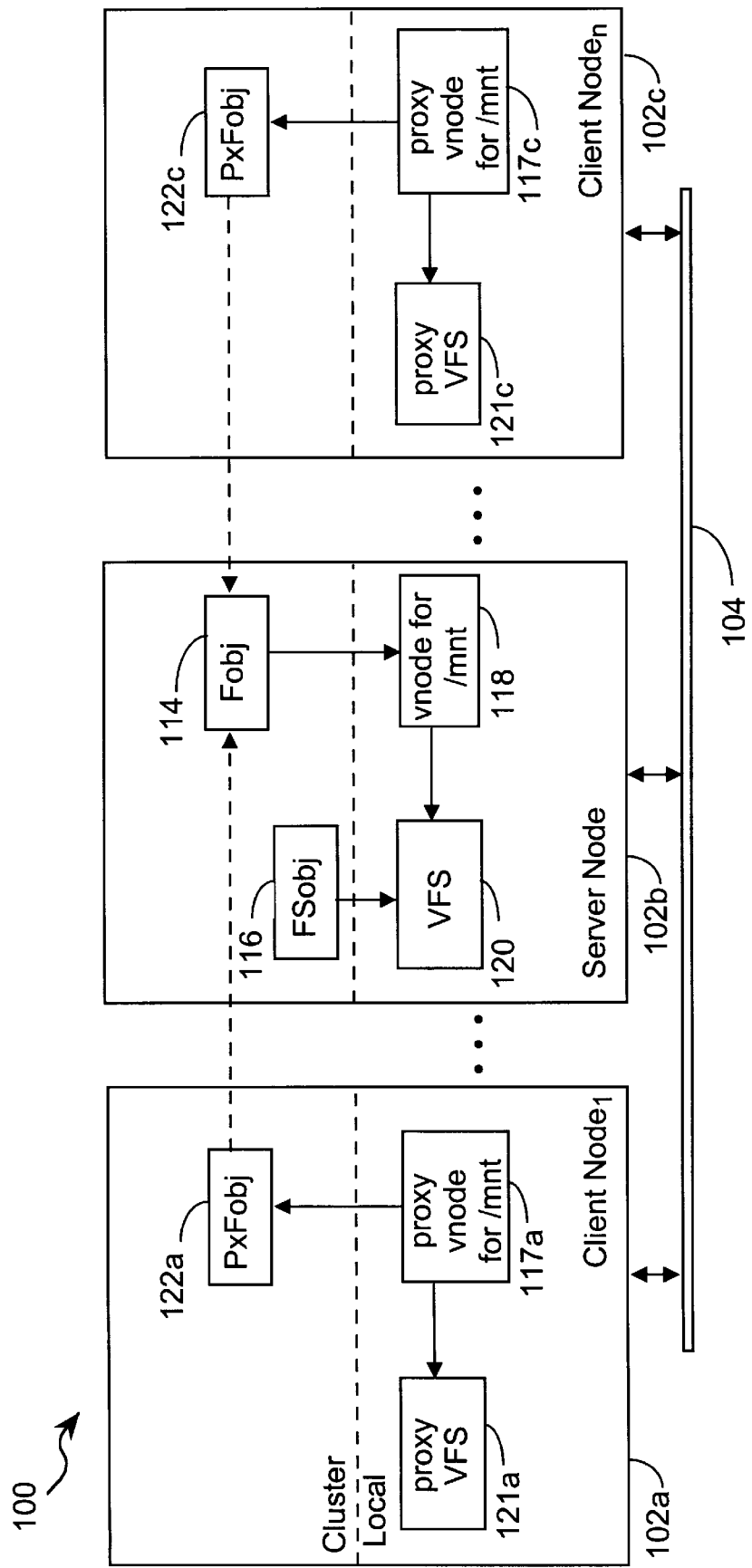
FIG. 3A represents an exemplary distributed file system of the global name space shown in FIG. 2A.
Figure 3B:
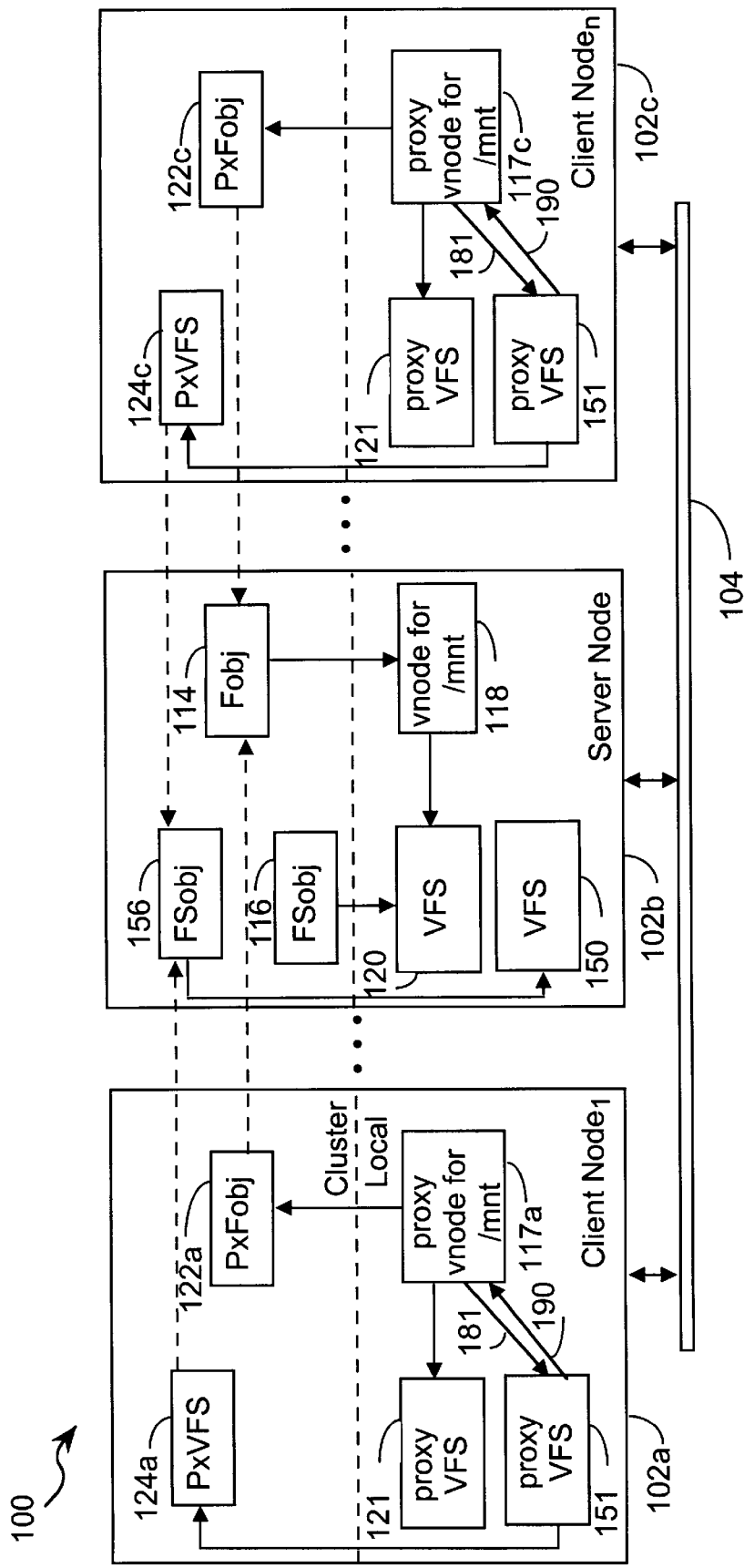
FIG. 3B represents an exemplary distributed file system of the global name space shown in FIG. 2B.

FIGS. 3A–3B illustrate the changes made to the cluster layer of the file system in order to mount the additional file system with root directory$_2$ into the global name space. FIG. 3A shows the file system with respect to the mount point/mnt before the mount and FIG. 3B shows the file system with respect to the mount point /mnt after the mount.

As shown in FIG. 3A, each node 102 has a vnode 118 or proxy vnode 117 representing the mount point, which in this example is the directory /mnt. The vnode 118 or its proxy 117 are linked to the VFS associated with file system containing the mount point. For each client node 102a, 102c, the proxy vnode 117 for the mount point is linked to a proxy file object 122. For the server node 102b associated with the mount point, there is a file object Fobj 114 linked to the vnode 118. There is also a file system object 116 representing the file system which is linked to a corresponding VFS 120. This infrastructure is in place before the file system with root directory$_2$ is mounted into the global name space.

The file system with root directory$_2$ is mounted in the global name space at the mount point /mnt. The file system after the mount is shown in FIG. 3B. The proxy vnode 117 for the mount point /mnt is linked by a mounted_here pointer 181 to the VFS representing the file system containing root directory$_2$. The proxy VFS 151 is linked by a covered_vnode pointer 190 to the mount point vnode. In each client node, the VFS 151 is linked to a PxVFS 124. The server node includes a file system object FSobj 156 linked to a corresponding VFS 150.

In addition, the global mount mechanism permits a process to unmount a file system from the global name space. The unmount procedure is performed such that the file system is unmounted from the same mount point and at the same time from each node in the cluster. The unmount of the file system having root directory$_2$ shown in FIG. 3B will result in the file system representing the global name space shown in FIG. 3A.

The aforementioned overview has presented the infrastructure of the distributed file system and the global mount mechanism. A more detailed description of the global mount mechanism and its operation is presented below.

System Architecture

Figure 4:
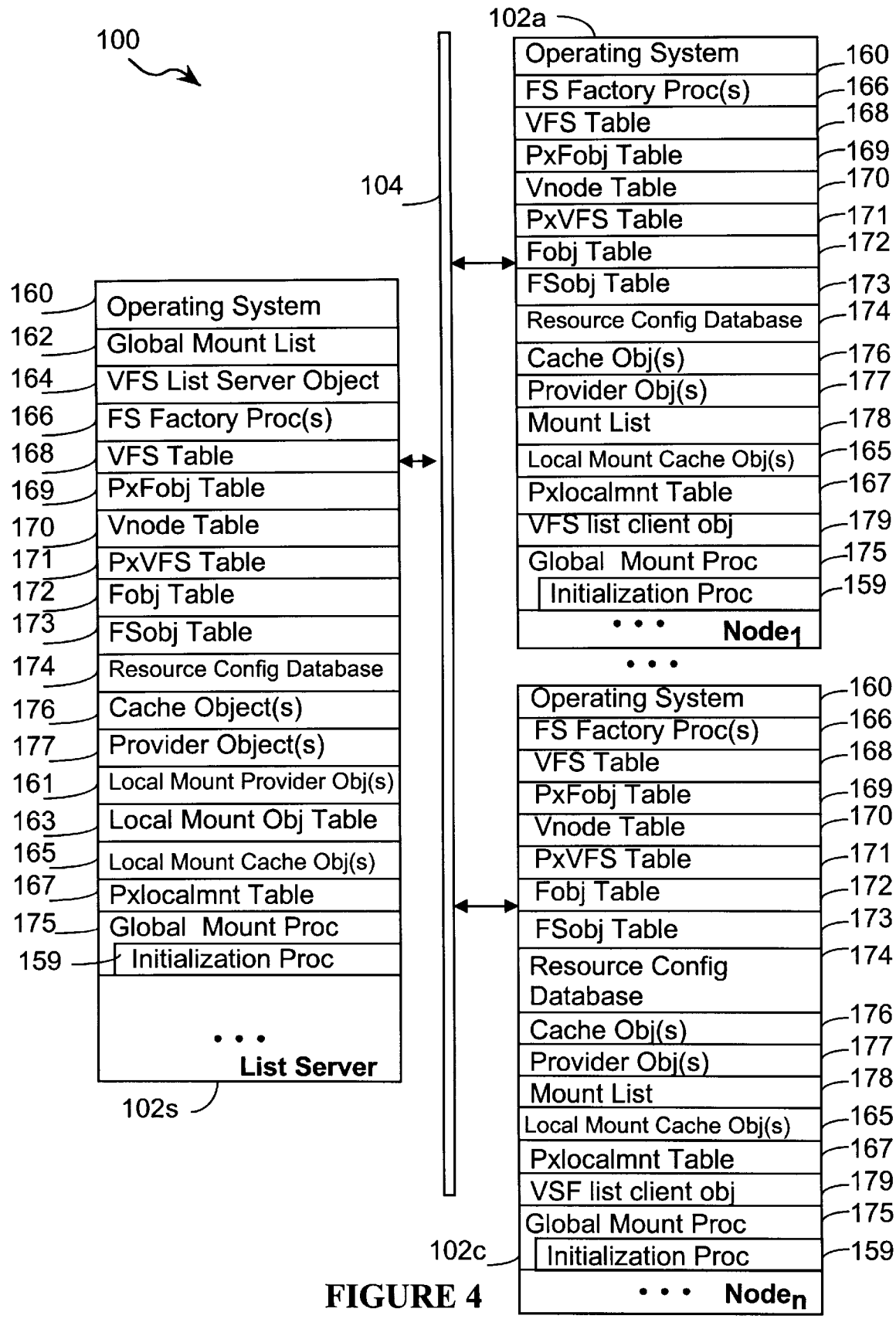
FIG. 4 is a block diagram of a distributed computing system incorporating the preferred embodiments of the present invention.

FIG. 4 illustrates the distributed computing system 100 embodying the present invention. A cluster of nodes 102 is interconnected via a communications link 104. Each node does not share memory with the other nodes of the cluster. The communications link 104 generically refers to any type of wire or wireless link between computers, such as but not limited to a local area network, a wide area network, or a combination of networks. The client/server computers use the communications link 104 to communicate with each other.

Each of the nodes 102 contains a number of data structures and procedures used to support the distributed file system and the global mount mechanism. Each node includes an operating system or kernel 160. In a preferred embodiment, the operating system 160 is the Solaris MC operating system, which is a product of Sun Microsystems, Inc. Background information on the Solaris MC operating system can be found in "Solaris MC: A Multi-Computer OS," Technical Report SMLI TR-95-48, November, 1995, Sun Microsystems, which is hereby incorporated by reference.

The Solaris MC operating system is a UNIX based operating system. As such, in describing the present technology, UNIX terminology and concepts are frequently used in describing the present invention. However, this is for illustration purposes and is not to be construed as limiting the invention to this particular operating system or file system design.

In addition, each node 102 can contain the following:

an operating system 160;

one or more file system (FS) factory procedures 166 that are used to instantiate a file system or VFS on an invoking node;

a VFS table 168 that stores one or more VFS 120, 121, 150, 151 data structures;

A PxFobj table 169 that stores one or more PxFobj data structures;

a vnode table 170 that stores one or more vnode 117, 118 data structures;

a proxy VFS (PxVFS) table 171 that stores one or more PxVFS data structures;

a file object (Fobj) table 172 that stores one or more file objects (Fobj);

a file system object (FSobj) table 173 that stores one or more file system objects (Fobj);

a file system resource configuration database 174 that stores all the file system (FS) factory procedures 166 within the cluster. The database 174 is accessed using a key including the file system type and file system resource that retrieves the FS factory procedure 166 corresponding to the requested resource;

one or more cache objects 176. Each cache object 176 is associated with a PxFobj and a server-side provider object 177. A method associated with the cache object 176 is used to access a particular global lock 182;

one or more provider objects 177. Each provider object 177 is associated with a Fobj and a client-side cache object 176. A method associated with the provider object 177 is used to enable read or write access to a particular vnode's global lock 182;

a mount list 178 that records the file systems (VFS) within the cluster;

one or more local mount cache objects 165 that are used to provide a local vnode with a global locking capability;

a proxy local mount object table 167 that stores one or more proxy local mount objects;

a VFS list client object 179 that interacts with the VFS list server object 164;

a global mount procedure 175 that is used to mount and unmount resources;

a bootstrap procedure 159 that is used to provide a local vnode with a global locking capability;

as well as other data structures and procedures.

One of the nodes is designated a list server node 102s since it tracks information regarding the globally mounted file systems in the cluster. In addition to the above mentioned data structures and procedures, the list server node 102s stores a global mount list 162 delineating all the globally mounted file systems in the cluster and stores a VFS list server object 164 that maintains the global mount list 162 and generates the requisite infrastructure needed to support a mounted resource in the global name space.

Figure 5A:
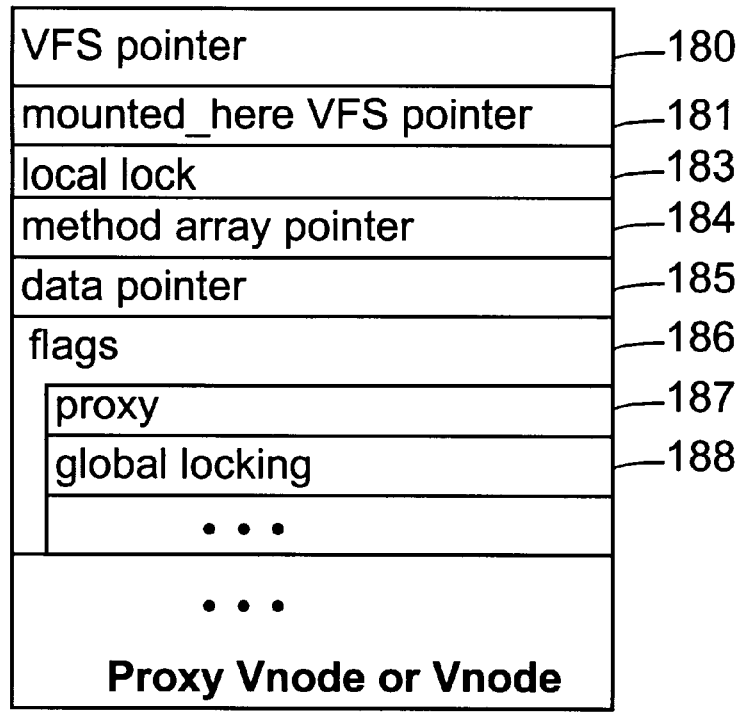
FIGS. 5A and 5B illustrate the vnode and VFS data structures used in an embodiment of the present invention.

FIG. 5A details the components of a vnode 118 and proxy vnode 117. A vnode 118 or proxy vnode 117 is used to represent each file and directory in the distributed file system. Each proxy vnode 117 or vnode 118 can include:

a pointer 180 to a VFS representing the file system associated with the file or directory the vnode or proxy vnode represents;

a mounted_here pointer 181 linking the vnode or proxy vnode to a VFS representing a file system that uses the vnode or proxy vnode as its mount point;

a local lock 183 that allows the vnode or proxy vnode to be locked by processes local to the node;

a method array pointer 184 that points to one or more methods used to perform operations on the vnode 18 or proxy vnode 117. An example of one such method is the lookup method that is used to find or generate a vnode;

a data pointer 185 that points to file system specific data pertinent to the file the vnode represents. When the vnode is a proxy, the file system specific data is a PxFobj which includes a pointer to the associated Fobj;

a flags array 186 including a proxy flag 187 indicating whether or not the vnode is a proxy and a global locking flag 188 indicating whether or not the vnode 118 that is otherwise part of the local name space should use the global locking facilities when it is locked or unlocked;

as well as other data.

Figure 5B:
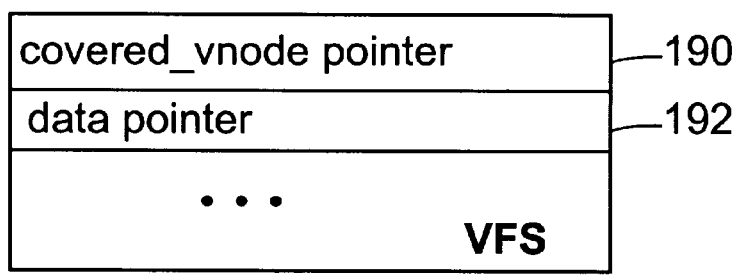

FIG. 5B details the components of a VFS 120, 121. A VFS 120, 121 is used to represent each file system. Each VFS can include:

a covered_vnode pointer 190 that points to the vnode that is the global mount point for the file system associated with the VFS;

a data pointer 192 that points to file system specific data. When the VFS is a proxy, this file system specific data is a PxVFS object, which in turn contains a reference to the file system object on the server;

as well as other data.

Figure 5C:
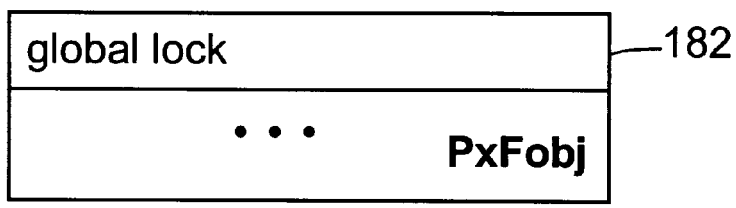
FIG. 5C illustrates the PxFobj data structure used in an embodiment of the present invention.

FIG. 5C details the components of the PxFobj 122 which can include a global lock 182 as well as other data. The global lock 182 is used to perform atomic operations on a vnode.

The system architecture including the data structures and procedures used to support the global mount mechanism has been described above. Attention now turns to the operation of the global mount mechanism. There are two central aspects to the global mount mechanism. The first is the manner in which the global mount mechanism is used to mount a new file system into an existing global name space. The second is the mechanism for establishing the global name space initially. The operation of the global mount mechanism is an existing global name space is described first, followed by a description of the manner in which the global name space is generated initially.

Mounting and Unmounting a File System in the Global Name Space

The global mount mechanism mounts a file system into the global name space at a common mount point on each node of the cluster. In addition, the mount occurs concurrently on each node in the cluster. A global lock is used to lock the proxy vnodes representing the mount point on all nodes while the mount mechanism is in operation. This ensures that no other process can alter the mount point while the global mount or unmount operation is proceeding.

Similarly, the global mount mechanism unmounts a file system from the global name space from a common mount point concurrently in each node in the cluster. The global lock is used to lock the vnode of the mount point when the unmount operation is in operation.

Furthermore, the global mount mechanism allows one node to mount a file system whose resources reside in another node. This can occur, for example, when the NFS protocol stack is constrained to run on a single designated node, or when a block special file whose media contains a UFS file system is usable only from the nodes where the hardware is connected. The global mount mechanism determines which node is appropriate to be the server for the resource and then utilizes the server's file system factory to instantiate the resource as a file system object. After the factory has instantiated the file system, the global mount mechanism uses the list server to add the file system to the list of globally mounted file systems as well as notify each client node of the new globally mounted file system. Each client node in turn will set up the requisite data structures needed to mount the file system at the mount point concurrently.

Figure 6:
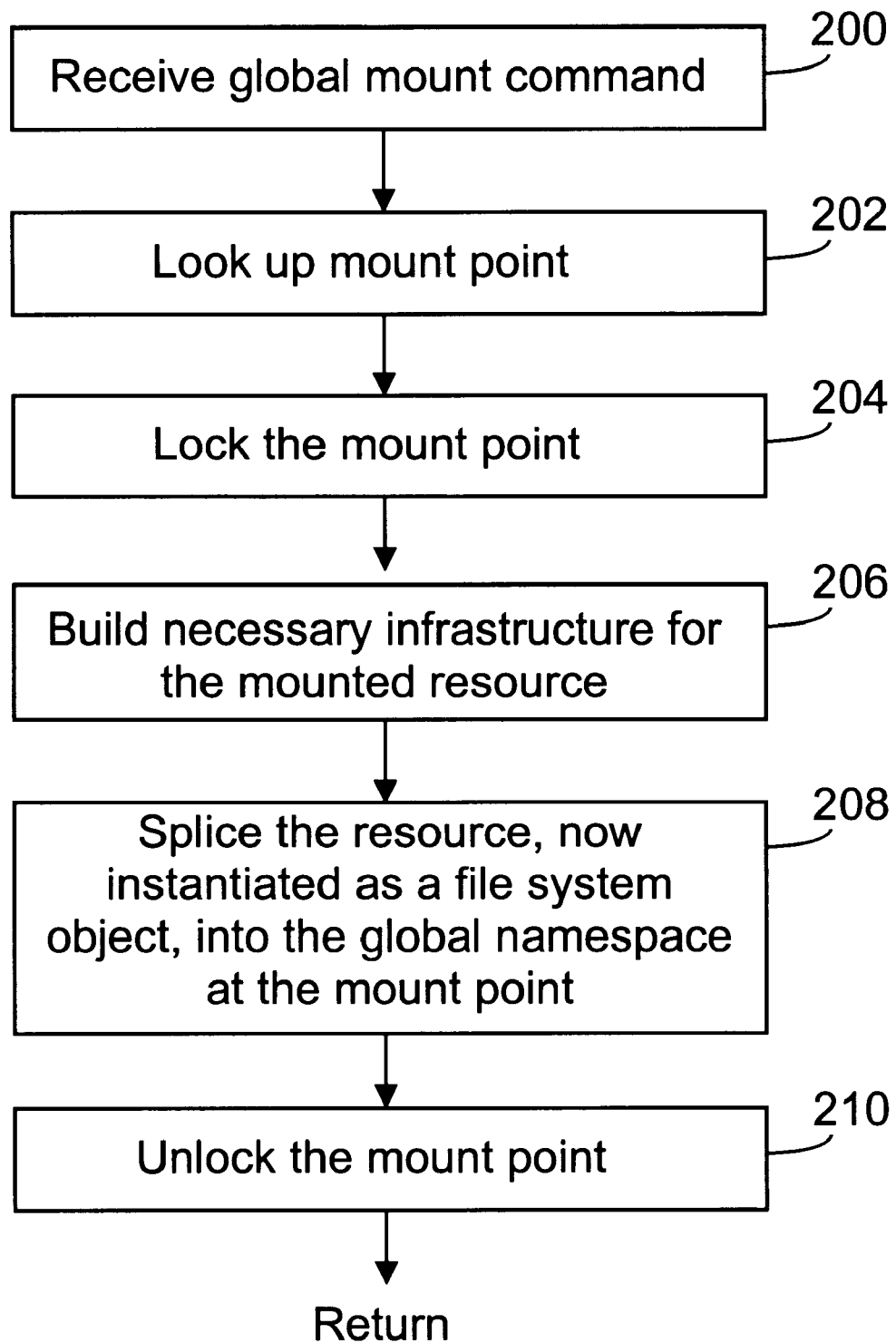
FIG. 6 is a flow chart illustrating the steps used by the global mount mechanism in mounting a new file system resource into the global name space.

FIG. 6 illustrates the steps used to mount a file system in the global name space. A user associated with a process issues a global mount command at a requesting node (step 200). The global mount command can have the following syntax:

mount-g<-F file system type><resource><mount point> where the -g indicates that the resource is to be mounted into the global name space, the -F indicates that the following argument is a file system type that can take one of many possible values; two commonly used values are:

ufs, indicating a Unix file system or nfs, indicating a network file system, the resource field indicates the file system resource that will be mounted, and the mount point field indicates the mount point or location in the global name space where the resource is to be mounted.

Upon receiving a global mount command, the global mount procedure 175 executes a lookup method to find the proxy vnode 117 associated with the mount point in the requesting node (step 202). If no proxy vnode 117 exists for the mount point in the requesting node, the lookup method will generate a proxy vnode 117 for the mount point and link it to the VFS 121 representing its containing file system. The method will also determine the server for the mount point and request that the server generate a file object Fobj 114 for the mount point. In response to this request, the server will, if as yet non-existent, generate the file object Fobj 114 and link it to the corresponding server-side vnode 118 representing the mount point. In addition, the server will generate a provider object 177 for the requesting node. An object reference to the Fobj 114 is then returned to the requesting node and is stored in the proxy file object PxFobj 122. The PxFobj 122 is then linked to the proxy vnode 117 of the mount point. Additionally, information is also returned to the requesting node for it to generate an associated cache object 176.

Once the mount point vnode 118 is generated on the server and its corresponding proxy 117 is generated in the requesting node, the global mount procedure 175 acquires the vnode's global lock 182 for write access (step 204). This is accomplished by using a distributed locking scheme that employs a single writer/multiple readers protocol. The locking scheme allows the mount or unmount operation to be performed on the mount point proxy vnode 117 while simultaneously blocking conflicting operations on the same mount point vnode 117 on the other nodes. The locking scheme is based on the distributed locking scheme recited in the "Decorum File System Architectural Overview," Proceedings of the USENIX Summer Conference 1990, pgs. 151–163, which is hereby incorporated by reference as background information.

The object of the locking scheme is to ensure that only one process has write access to the vnode 117, 118 at a time or that multiple processes have concurrent read access to the vnode 117, 118 at a time. This scheme is implemented using cache 176 and provider 177 objects. The cache object 176 is used by the proxy file object PxFobj 122 to request the global lock 182. The global lock 182 can be acquired for either read or write access. The provider object 177 is used to coordinate the requested read or write access with the other nodes.

Figure 7:
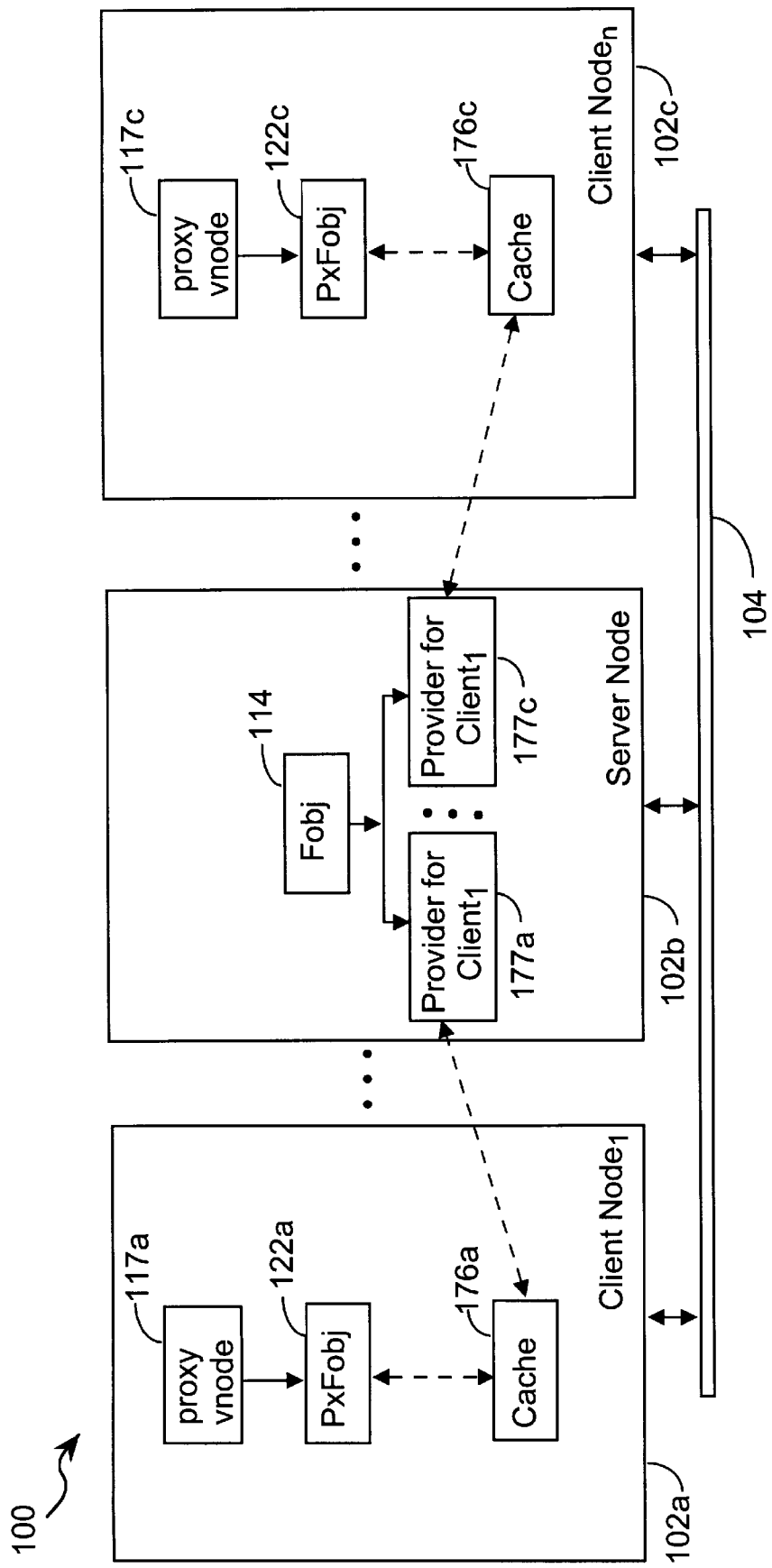
FIG. 7 illustrates the distributed locking mechanism used in an embodiment of the present invention.

FIG. 7 illustrates the distributed locking scheme. All file access is performed through a proxy vnode 117. In order to perform an operation coherently on a vnode, the distributed locking scheme locks the collection of proxy vnodes 117 across all nodes to accomplish the coherent operation.

Each client node 102a, 102c has a PxFobj 122 associated with the file object 114 for the mount point. The PxFobj 122 has a cache object 176 that is used to request the file's global lock for either read or write access. The server 102b for the file has a provider object 177 for each client node. A provider object 177 is paired with a respective client-side cache object 176. The provider objects 177 are associated with the file object Fobj 114 associated with the vnode 118 for the mount point. A request for the vnode's global lock 182 is made using the PxFobj 122 to the cache provider 176. The request is transmitted from the cache provider 176 to the respective server-side provider 177 that coordinates with the other providers 177 to determine whether the access should be granted or should be blocked.

For a mount or unmount operation, write access is necessary. The request is made to the associated cache object 176 which in turn calls the corresponding provider 177. The provider 177 consults with all other providers 177 and determines whether or not the access can be granted.

The locking protocol allows a write access when no other read or write access is active. Alternatively, multiple read accesses can occur concurrently when there is no write access active. Thus, only one write access is allowed at a time. If another provider 177 has been granted either read or write access, an attempt will be made to invalidate the access. If this cannot be done, the requesting provider 177 will wait until the outstanding write access is completed before it is granted write access.

Referring back to FIG. 6, once the vnode's global lock 182 has been acquired for write access, the global mount procedure 175 determines the appropriate node that should become the server for the resource (step 206). At times the node servicing the global mount command may not be the appropriate server for the resource that will be mounted. This may be attributable to several different factors, such as constraints imposed by the resource. As noted above, disparity in resource distribution can occur.

In order to accommodate this problem, the global mount procedure 175 determines which node is best suited to act as the server for the resource (step 206). This is accomplished by querying the cluster file system resource database 174 for the appropriate file system factory (fs_factory) procedure 166. Each fs_factory procedure 166 is associated with a particular node and used to instantiate a file system and VFS.

The global mount procedure 175 then invokes the appropriate fs_factory procedure 166 to generate a VFS 150 in the server node for the mounted resource and a corresponding file system object FSobj 156 (step 206).

Next, the global mount procedure 175 calls the list server 102s with information about the newly generated FSobj 156 and the resource used to instantiate it (step 206). The list server 102s adds the newly generated FSobj 156 to the cluster-wide global mount list 162 (step 206). In addition, the list server 102s contacts each node 102 in the cluster and informs it of the mounted resource and mount point and transmits an object reference to the corresponding FSobj 156 (step 206). Each node 102, in turn, searches for a proxy VFS 151 for the FSobj 156 and a proxy vnode 117 for the mount point Fobj 114 (step 206). If these proxies do not exist in the node, they are created. When the proxy vnode 117 for the mount point is created, the file system specific data or PxFobj 122 is generated as well. Similarly, when the proxy VFS 151 is created, the file system specific data or PxVFS 124 is generated as well. Then the node 102 updates the mount list 178 with the proxy VFS 151 (step 206).

The next step is to splice the resource into the global name space at the mount point (step 208). The global mount procedure 175 performs this task in each node by setting the mounted_here pointer 181 of the mount point's proxy vnode 117 to the proxy VFS 151 representing the mounted resource. The covered_vnode pointer 190 of the proxy VFS 151 representing the mounted resource is linked to the vnode 117 of the mount point. When the mounted_here pointer 181 is set, this indicates that a file system has been mounted at the mount point. Finally, the global lock of the mount point's vnode 117, 118 is released (step 210).

Figure 8A:
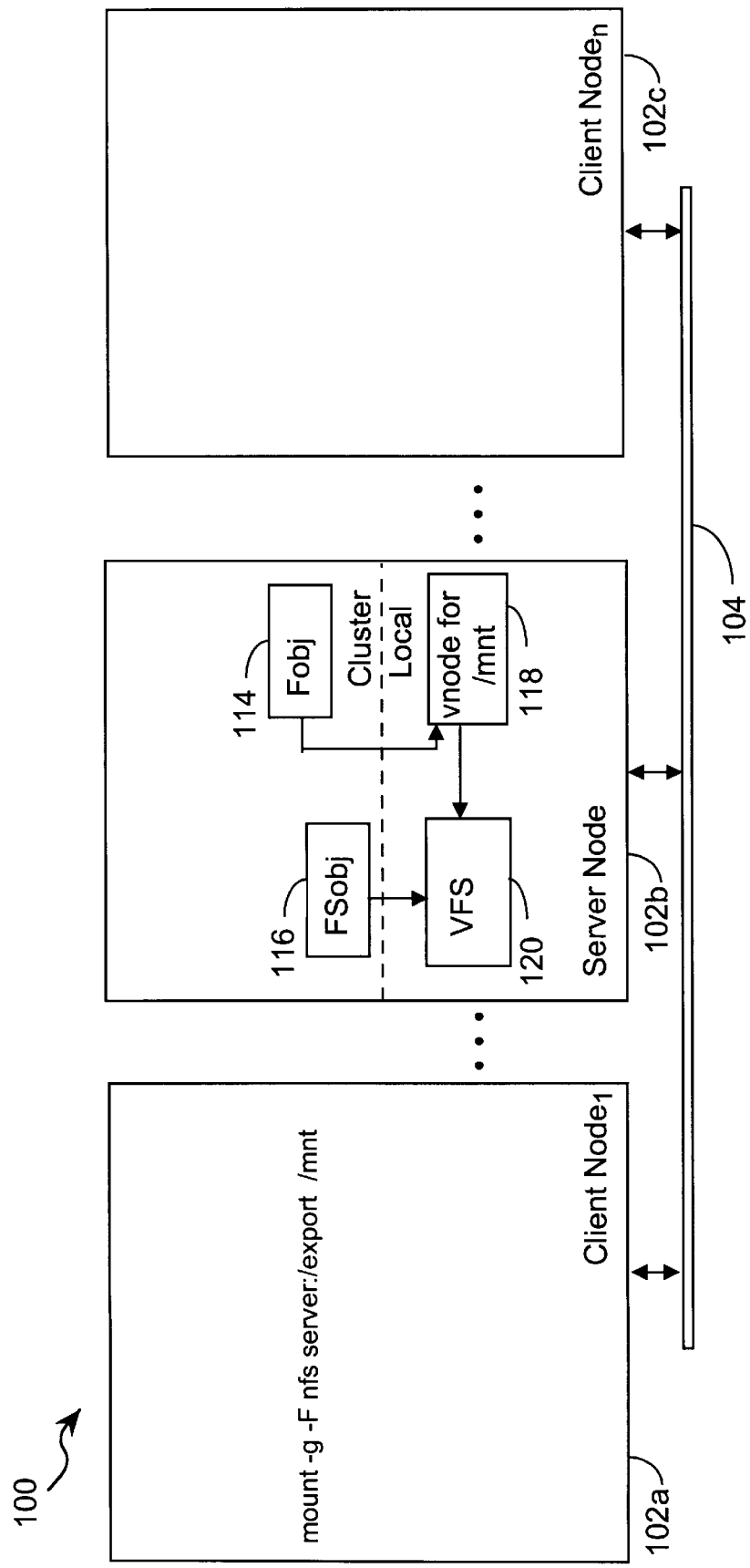
FIGS. 8A–8D illustrate by way of an example the global mount mechanism of FIG. 6.

FIGS. 8A–8D illustrate the mount of the file system 132 shown in FIG. 2 into the global name space. Referring to FIG. 8A, a client node 102a receives a global mount command specifying that an NFS file system is to be mounted in the global name space at the mount point /mnt. The requesting node does not have a vnode 118 or proxy vnode 117 for the mount point. However, on server node 102b, the Fobj 114 already exists.

Figure 8B:
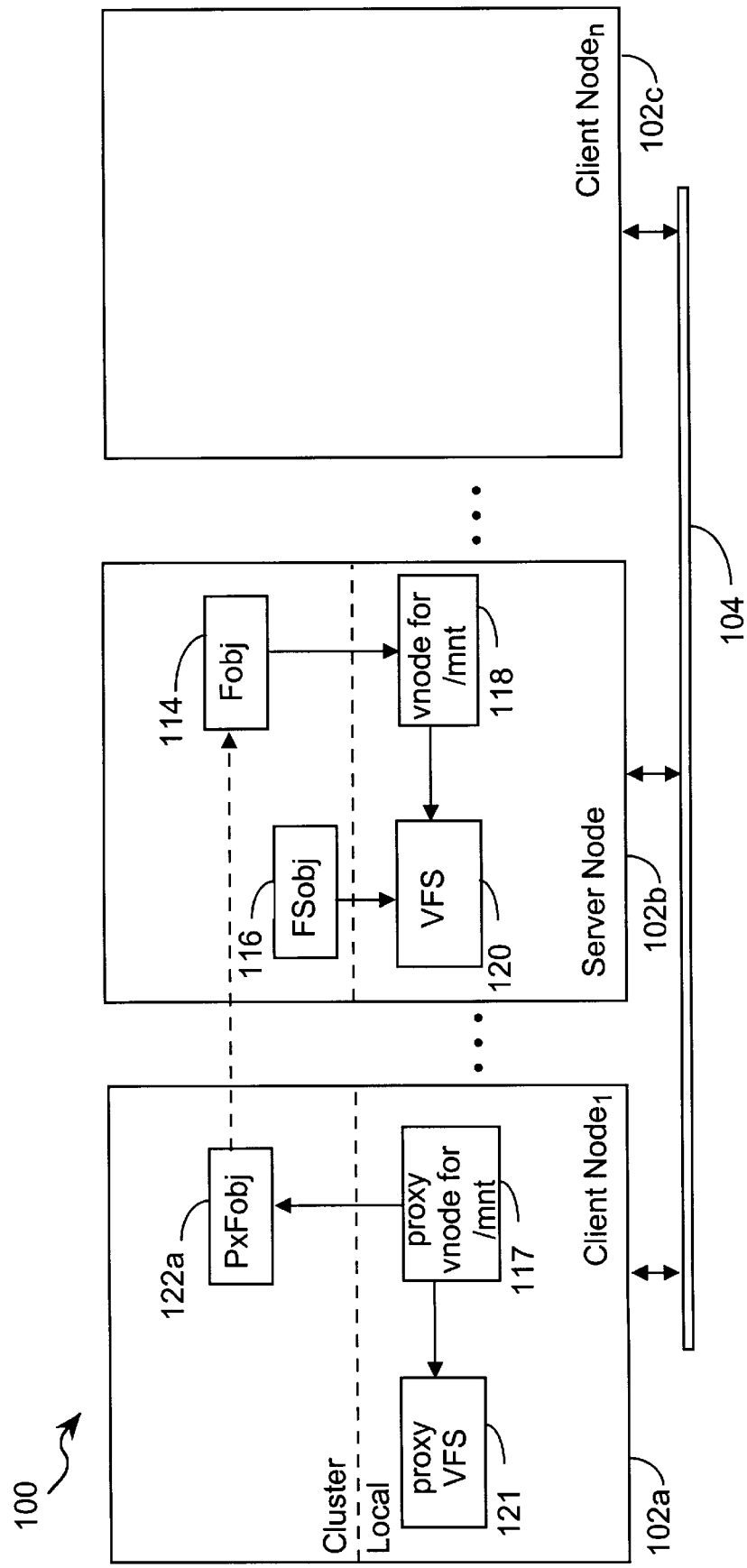

FIG. 8B illustrates the file system 100 after the client node 102a looks up the mount point (step 202). The lookup method generates a proxy vnode 117 for the mount point on the client node 102a. A reference to the Fobj 114 is transmitted to the client node 102a and stored in a newly created proxy file object PxFobj 122a.

Figure 8C:
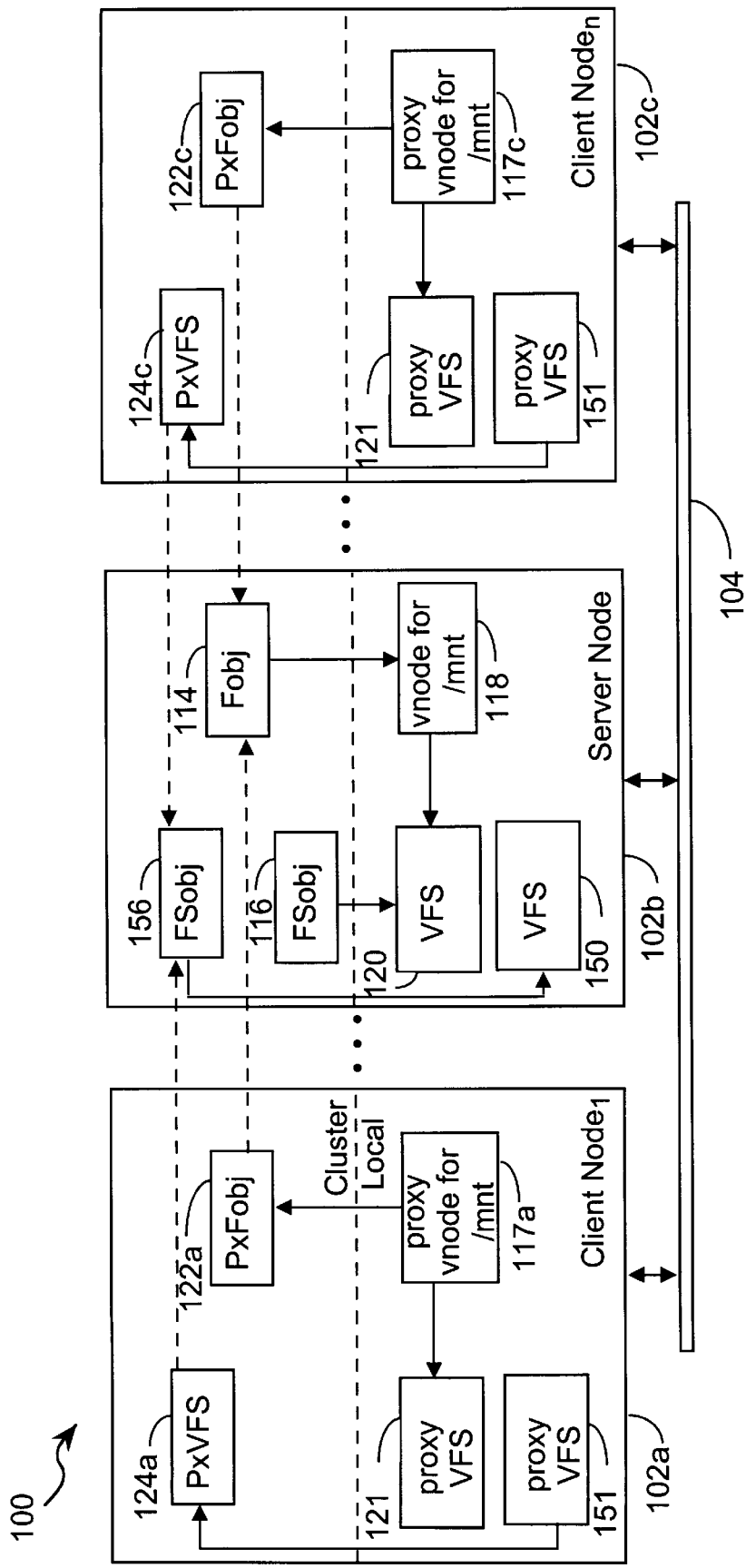

FIG. 8C illustrates the file system 100 after the list server 102s (not shown) generates the necessary infrastructure to instantiate a file system from the designated file system resource (step 206). A VFS 150 is generated in the server node 102b for the file system associated with the mounted resource and a corresponding FSobj 156. The list server 102s passes an object reference to the FSobj 156, an object reference to the mount point object 114, and a copy of the arguments to the mount command to each client node. In turn, each client node 102 generates a proxy vnode 117 for the mount point as well as a proxy VFS 151 representing the mounted resource and file system specific data 124 for that proxy VFS 151.

Figure 8D:
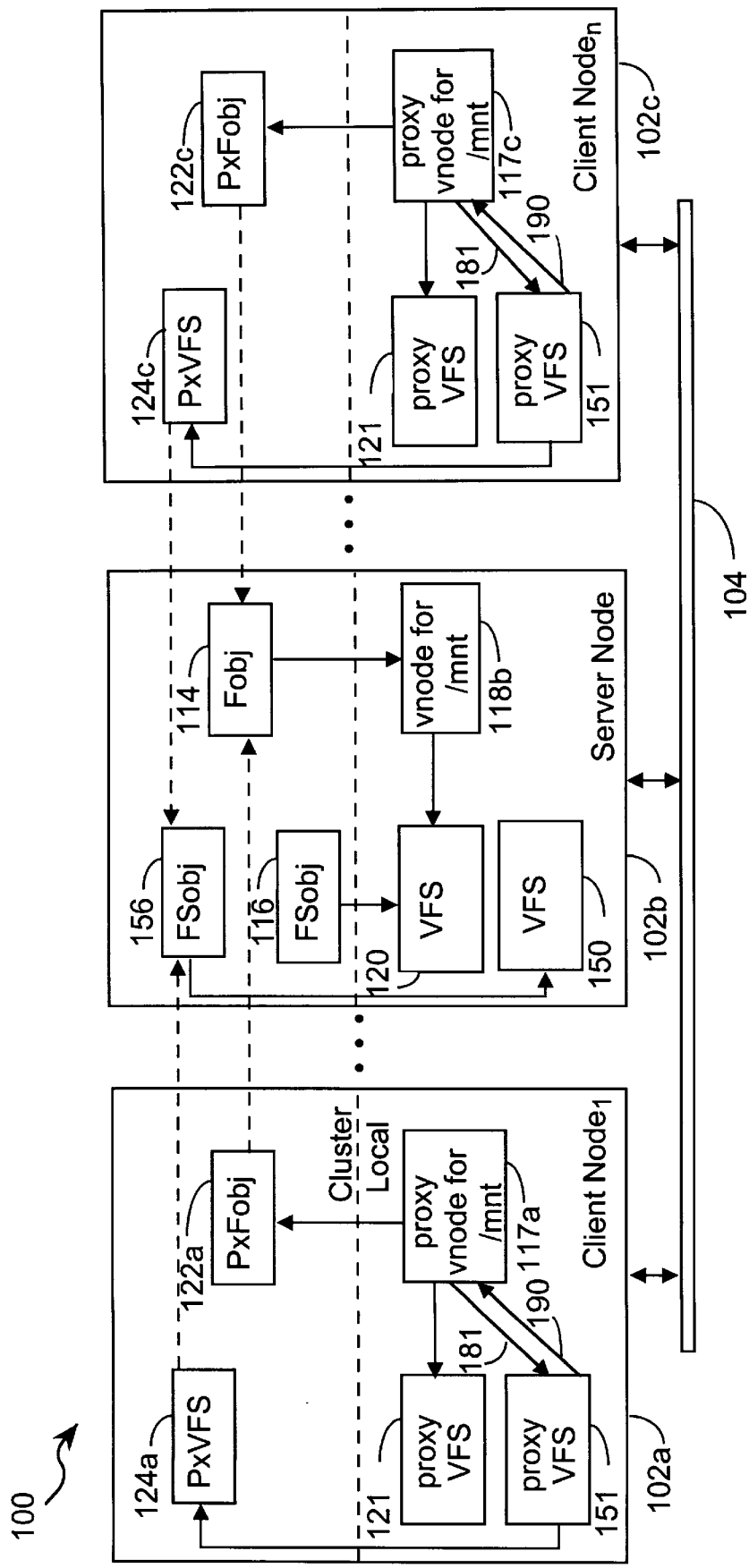

FIG. 8D represents the file system after the mounted resource is spliced into the global name space (step 208). The proxy vnode 117 for the mount point has its mounted_here pointer 181 linked to the VFS 151 representing the new file system, and the VFS 151 has its covered_vnode pointer 190 set to the proxy vnode 117 representing the mount point.

Figure 9:
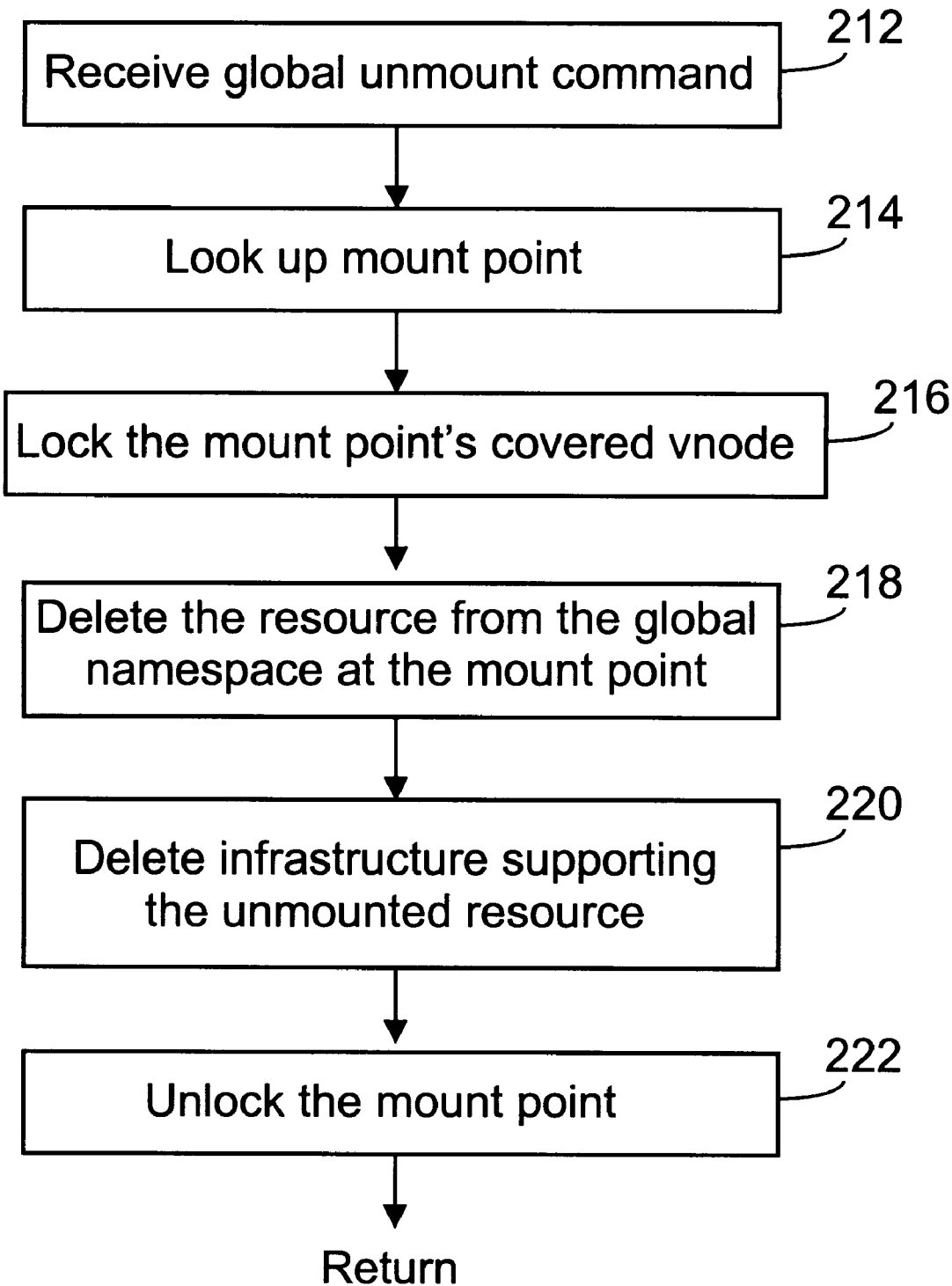
FIG. 9 illustrates the steps used by the global mount mechanism in unmounting a mounted file system resource from the global name space.
Figure 10:
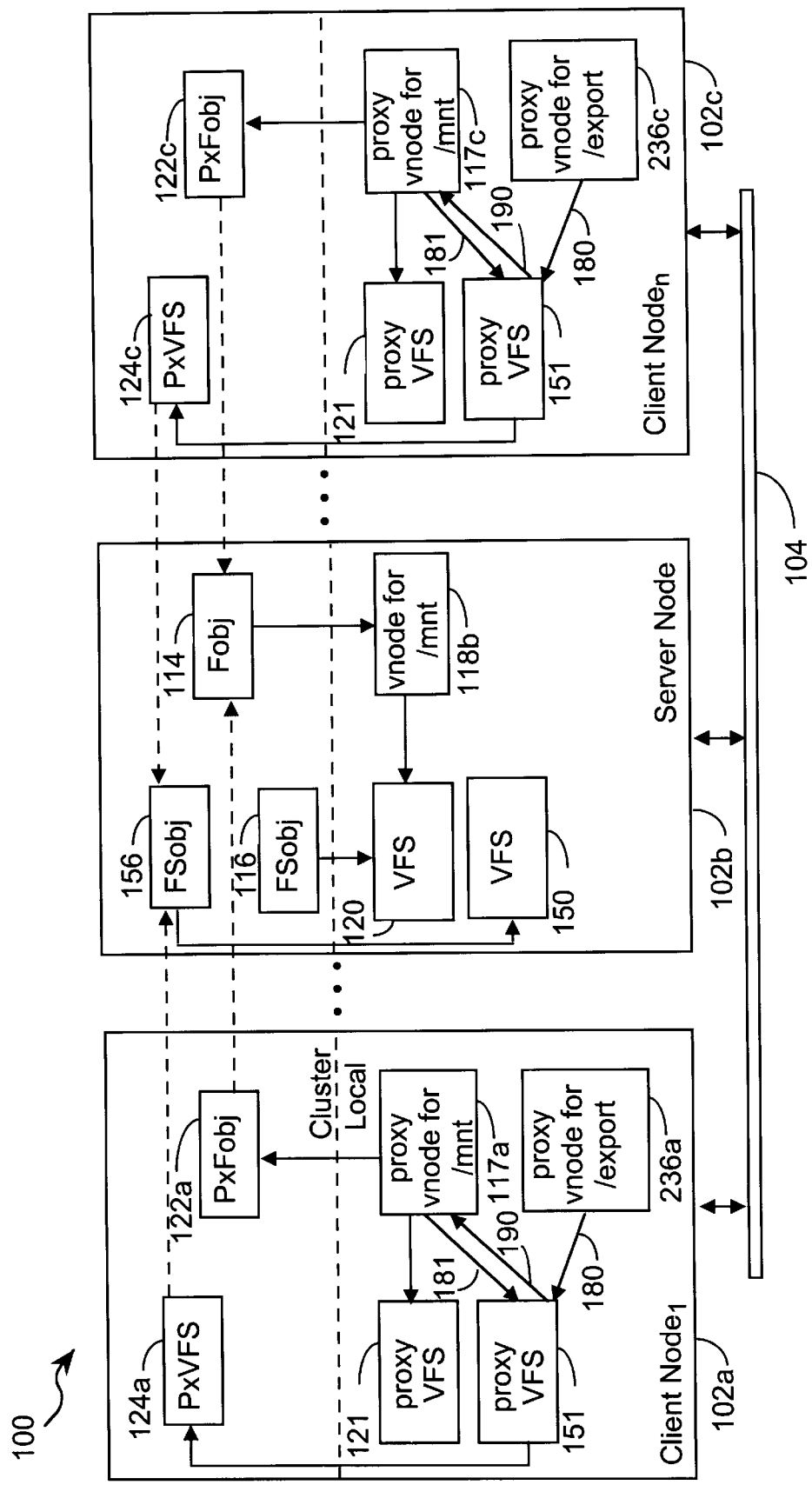
FIG. 10 illustrates by way of an example the global unmount mechanism of FIG. 9.

FIG. 9 illustrates the steps used by the global mount mechanism 175 to unmount a mounted resource from the global name space. FIG. 10 illustrates an exemplary unmount of the mounted file system illustrated in FIGS. 8A–8D. A process associated with a node receives a global unmount command (step 212). The global unmount command can have the following syntax:

unmount <mount point> where the mount point field indicates the mount point or location in the global name space where the file system resource is to be unmounted from.

The global mount mechanism 175 will then look up the proxy vnode of the unmounted resource utilizing the same steps described above (step 214). In FIG. 10, the unmounted resource's root directory is represented by proxy vnode 236. After finding the unmounted resource's root vnode 236, the global mount mechanism 175 obtains the associated VFS 151 through the VFS pointer 180. The VFS's 151 covered_vnode pointer 190 is traversed to vnode 117, which represents the mount point. The mount point vnode 117 is then locked in accordance with the locking mechanism described above (step 216).

Once the mount point vnode 117 is locked, the list server 102s is called to have each node unsplice the file system resource from that node's mount point proxy vnode 117 (step 218). This is performed by deleting the contents of the mounted_here VFS pointer 181 (step 218).

The global mount mechanism 175 will then delete the infrastructure used to support the unmounted resource (step 220). The list server 102s will delete the VFS 121 from the global mount list 162 and inform the other client nodes to delete their VFS 121 and PxFobj 122 data structures as well.

The global lock 182 representing the mount point is then released in a similar manner as was described above (step 222).

The above description details the manner in which the global mount mechanism mounts or unmounts a file system to and from the global name space. Attention now turns to the manner in which the global name space is generated initially.

Generating the Global Name Space

A characteristic of the global name space is that each directory in the global name space can serve as a global mount point. New file systems can be incorporated into the global name space at a global mount point. A distinguishing feature of a global mount point is that it can be locked globally.

Initially, when each node in the cluster "boots up", the global name space does not exist. Instead, each node has a set of local vnodes representing the file resources associated with a particular node. The first step in incorporating these local vnodes into the global name space is to provide each local vnode with a global locking capability. The global locking capability allows a local vnode representing the same file resource in each node to be locked concurrently. Once the local vnode acquires a global locking capability, the local vnode can be used as a global mount point and a mount can be established there that becomes a part of the global name space.

In order for a local vnode to acquire the global locking capability, a distributed locking mechanism is generated to prevent two or more nodes from establishing the global lock capability for the same local vnode at the same time. Thus, only one node needs to perform the global namespace initialization procedure.

One node will request that a local vnode or mount point be granted global locking capability. The list server 102s acts as the server for the local vnode or mount point and generates a local mount object 189 to represent the mount point in the list server 102s. The list server 102s also generates a local mount provider object 161 for each node in the cluster. The list server 102s then visits each node in the cluster, providing the node with enough information for the node to construct a proxy local mount (pxlocalmnt) object 167 and a local mount cache object 165 in the client node. The cache/provider object pair is then used to lock the mount point that is distributed in each node in the cluster. As each node is visited, locking responsibility for the vnode representing the mount point on that node is transferred from the vnode itself to the cache/provider pair newly associated with the vnode.

Figure 11:
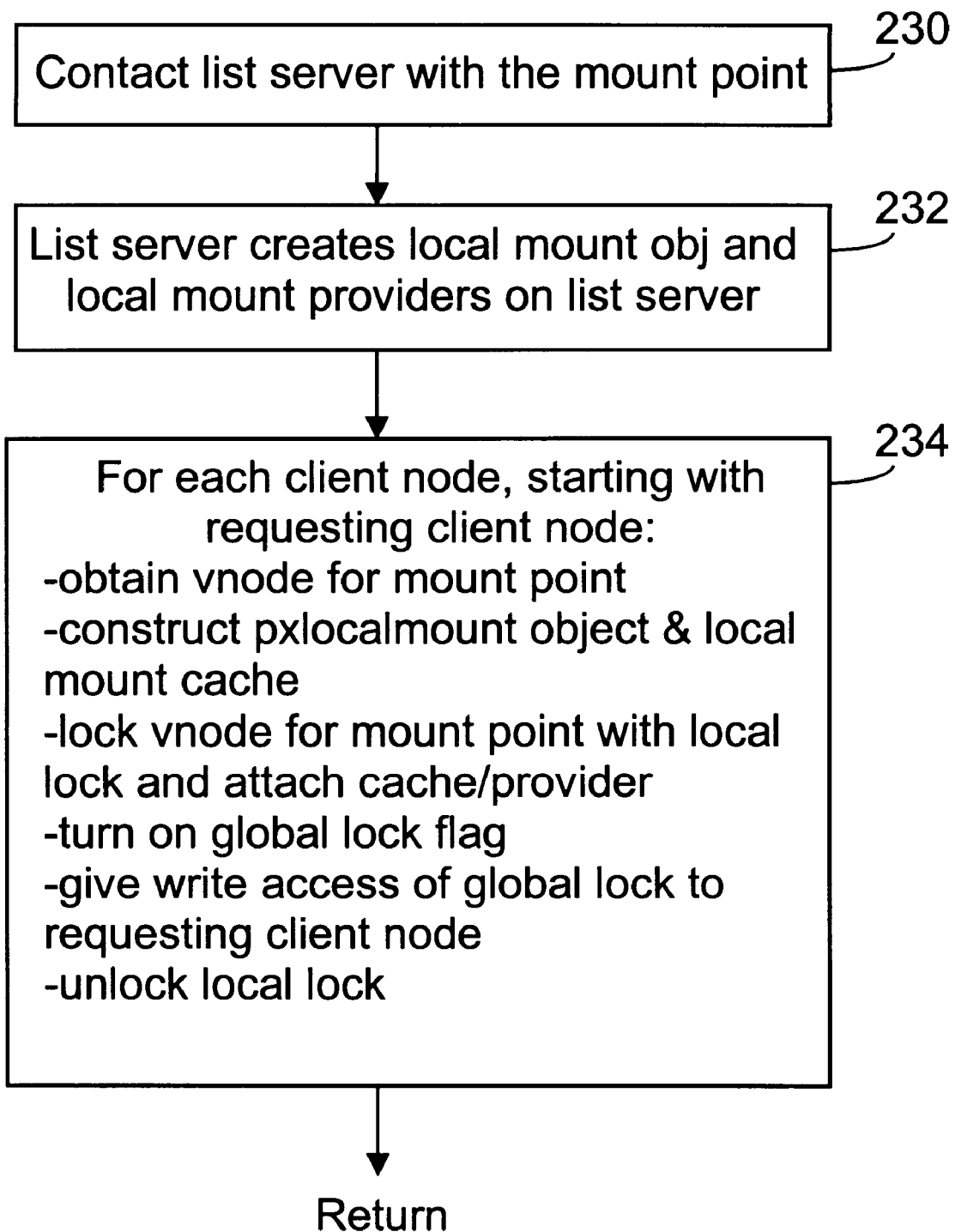
FIG. 11 illustrates the steps used to generate a global mount point in a local name space.
Figure 12:
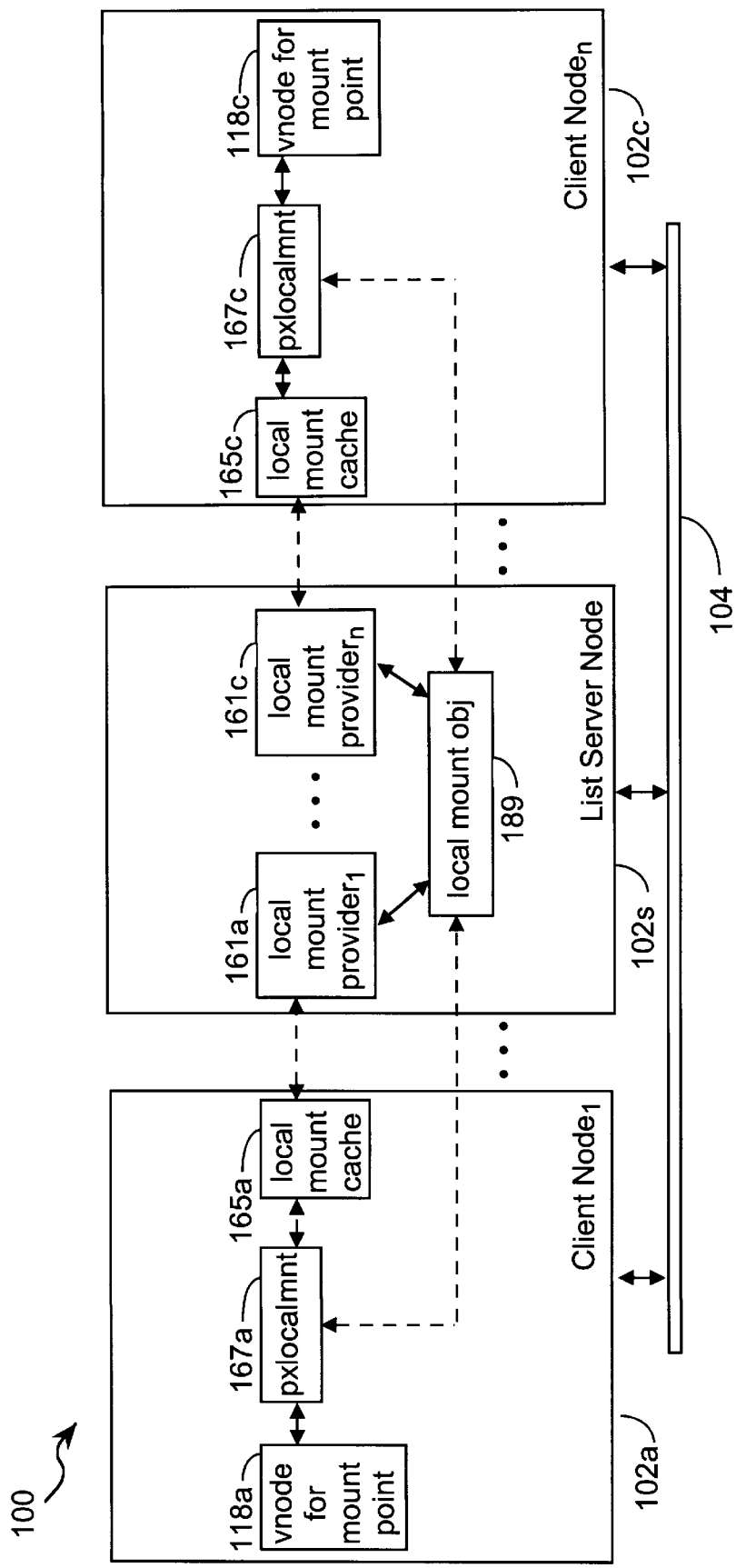
FIG. 12 illustrates the distributed locking mechanism used in FIG. 11.

FIGS. 11 and 12 illustrate the steps used to provide a mount point with a global locking capability. These steps can be performed by an initialization procedure 159. A node 102 contacts the list server 102s with a request to provide a mount point with global locking capability (step 230). The list server 102s creates a local mount object 189 representing the mount point in the list server 102s and a local mount provider object 161 for each node in the cluster (step 232).

The list server 102s then "visits" each client node by calling the list client on each node in turn, starting with the client node 102a that initiated the request (step 234). The list server 102s provides information to each client node 102a, 102c which the client node's 102a, 102c list client uses to perform the following tasks. The client node 102a, 102c will perform the pathname lookup method on the mount point, thereby generating a vnode 118 for the mount point. The list server 102s will send the client node 102a, 102c an object reference to the local mount object 189 which the client node 102a, 102c uses to construct a proxy local mount object 167 (pxlocalmnt). The pxlocalmnt 167 is linked to the vnode 118 representing the mount point. In addition, the client node 102a, 102c generates a local mount cache object 165 that is paired to a corresponding local mount provider 161 (step 234).

Next, the local lock 183 associated with the mount point's vnode 118 is acquired. This is performed in a similar manner as was described above with respect to FIGS. 6 and 7 (step 234).

Once the local lock 183 is acquired, the global lock flag 188 in the mount point's vnode 118 is turned on. When the global lock flag 188 is turned on or set, this indicates that the associated mount point has acquired the global locking capability. The requesting client node 102a is then given write access to the global lock 182. Lastly, the local lock 183 is released (step 234).

This procedure is performed in each client node 102a, 102c (step 234). At the completion of this procedure, the mount point has acquired global locking capability. It then can be used as a mount point for a new file system resource. In this case, the global mounting procedure 175 described above can be used to mount a new file system resource at the mount point.

Accordingly, the global name space is generated by creating global mount points from the local vnodes in each node's local namespace. New file system resources can then be mounted into the global name space at these newly created global mount points. The progression of these steps will generate the global name space.

Alternate Embodiments

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

The present invention is not limited to the computer system described in reference to FIG. 1. It may be practiced without the specific details and may be implemented in various configurations, or makes or models of distributed computing systems, tightly-coupled processors or in various configurations of loosely-coupled microprocessor systems.

Further, the method and system described hereinabove is amenable for execution on various types of executable mediums other than a memory device such as a random access memory. Other types of executable mediums can be used, such as but not limited to, a computer readable storage medium which can be any memory device, compact disc, or floppy disk.

What is claimed is:

1. A method for maintaining a global name space in a computing system that has a plurality of nodes interconnected by a communications link, the method comprising the steps of:

(a) providing a global name space representing a plurality of global file system resources accessible from each node of the plurality of nodes, each global file system resource including a plurality of file resources, the global name space including a plurality of global pathnames with each global pathname representing one of the global file resources, each global pathname including one or more global directories, the global name space distributed in each node;

(b) providing a first file system resource for mounting in the global name space at a designated first mount point selected from the global directories;

(c) performing a global mount operation such that the first file system resource is mounted in the global name space at the designated mount point on every node of the plurality of nodes, the global mount operation comprising the steps of:

concurrently locking the first designated mount point in each node, wherein the step of concurrently locking comprises locking a respective local lock in every node of the plurality of nodes, each respective local lock being associated with the first designated mount point;

after locking the first designated mount point in every node of the plurality of nodes, mounting the first file system resource at the first designated mount point in every node of the plurality of nodes; and concurrently unlocking the first designated mount point in every node of the plurality of nodes by unlocking the respective local lock at each node.

2. The method of claim 1, further comprising the steps of:

selecting a second file system resource for unmounting from the global name space at a second mount point selected from the global directories;

concurrently locking the second mount point in each node;

unmounting the second file system resource from the second mount point in each node; and concurrently unlocking the second mount point in each node.

3. The method of claim 1, wherein the step of providing a global name space further comprises the steps of:

(1) providing a plurality of local name spaces, each local name space representing a plurality of local system resources associated with one node of the plurality of nodes, each local system resource representing a plurality of local file resources, said local name space including a plurality of local pathnames, each local pathname representing one of said local file resources and including one or more local directories;

(2) enabling one or more of said local directories with a global locking capability that enables the one local directory to be locked by each of the nodes, the one local directory being a global directory in the global name space; and (3) concurrently mounting one or more of the local system resources into the global name space at a select one of said global directories, each mounted local file system resource being a global file system resource.

4. The method of claim 3, wherein the step of concurrently mounting further comprises the steps of:

(i) concurrently locking the select global directory in each node;

(ii) mounting a first local file system resource at the select global directory in each said node; and (iii) concurrently unlocking the select global directory in each node.

5. A computer system for maintaining a global name space, the system including a plurality of nodes interconnected by a communications link, the system comprising:

a plurality of global file system resources accessible from each node of the plurality of nodes, each global file system resource representing a plurality of global file resources;

a global name space representing the global file system resources and including a plurality of pathnames, each pathname of the plurality of pathnames representing one of the global file resources, each pathname including one or more global directories, each global directory being a global mount point to which a new file system resource can be mounted, the global name space distributed in each node;

a first locking mechanism distributed in every node of the plurality of nodes, the first locking mechanism being associated with one of the global mount points, the first locking mechanism having a capability to concurrently lock a same global directory in every node of the plurality of nodes; and a global mount mechanism distributed in every node of the plurality of nodes, the global mount mechanism having a capability to mount a new file system resource into the global name space at the one mount point concurrently on every node of the plurality of nodes.

6. The system of claim 5, further comprising:

a plurality of vnode mechanisms, each vnode mechanism representing in each node a global directory associated with the global name space;

a plurality of virtual file system (VFS) mechanisms, each VFS mechanism representing in each node a file system resource associated with the global name space; and the global mount mechanism establishing a VFS mechanism for a newly mounted file system resource in each node, establishing a vnode mechanism in each node for a global mount point, and linking the mount point vnode mechanism in each node to the VFS mechanism representing the new file system resource.

7. The system of claim 6, further comprising:

a plurality of file system objects wherein each file system object (FSobj) represents a file system resource in a select node of said plurality of nodes;

a plurality of proxy file system objects wherein each proxy file system object (PxFSobj) is used to reference a corresponding FSobj; and the global mount mechanism selecting one node of the plurality of nodes as a server node for a newly mounted file system resource, the server node generating a FSobj for the newly mounted file system resource, linking the FSobj to a corresponding VFS mechanism representing the newly mounted file system resource and passing an object reference to the newly mounted file system resource to all other nodes, each node receiving the object reference generating a proxy file system object (PxFSobj) from the object reference and linking the PxFSobj to a corresponding VFS mechanism representing the newly mounted file system resource in the respective node.

8. The system of claim 5, wherein the global mount mechanism has a capability to unmount a mounted file system resource from the global name space, the global mount mechanism locating a same mount point in each node from which the mounted file system resource is to be unmounted, concurrently locking the same mount point in each node, unmounting the mounted file system resource from the same mount point in each node, and unlocking the mount point in each node.

9. The system of claim 5, further comprising:

a plurality of local name spaces, each local name space associated with a particular node of the plurality of nodes and representing a plurality of local file system resources associated with the particular node, each local file system resource representing a plurality of local file resources, the local name space including a plurality of local pathnames, each local pathname representing one of the local file resources and including one or more local directories; and an initialization mechanism having a capability to generate the global name space from one or more of the local name spaces, the initialization mechanism enabling a first local directory with a global locking capability thereby generating the global name space and making the enabled local directory a global mount point within the global name space; and mounting a local file system resource into the global name space at the global mount point.

10. The system of claim 9, further comprising:

a second locking mechanism distributed in every node of the plurality of nodes, the second locking mechanism having a capability to concurrently lock a same local directory in every node of the plurality of nodes; and the initialization mechanism using the second locking mechanism to lock the first local directory in every node of the plurality of nodes to enable the first local directory with the global locking capability.

11. A computer program product for storing data for access by programs being executed on a data processing system including a plurality of nodes, the computer program product comprising a computer storage medium and a computer program mechanism embedded therein, the computer program mechanism comprising:

a plurality of global file system resources accessible from each node of the plurality of nodes, each global file system resource representing a plurality a global file resources accessible from each node of the plurality of nodes;

a global name space having a capability to represent the global file system resources, the global name space including a plurality of pathnames that each represent one of the global file resources, each pathname including one or more global directories, each global directory being a global mount point to which a new file system resource can be mounted, the global name space distributed in each node;

a first locking mechanism distributed in every node of the plurality of nodes, the first locking mechanism having a capability to concurrently lock a same directory in every node of the plurality of nodes; and a global mount mechanism, coupled to the first locking mechanism and distributed in every node of the plurality of nodes, the global mount mechanism having a capability to mount a new file system resource into the global name space at a specified mount point concurrently on every node of the plurality of nodes, and to perform the file system resource mounting only after the first locking mechanism has locked the same directory in every node of the plurality of nodes.

12. The mechanism of claim 11, further comprising:

a plurality of vnode mechanisms, each vnode mechanism representing a global directory associated with the global name space;

a plurality of virtual file system (VFS) mechanisms, each VFS mechanism representing a file system resource associated with the global name space; and the global mount mechanism establishing a VFS mechanism for a new file system resource in each node, establishing a vnode mechanism in each node for a global mount point, and linking the mount point vnode mechanism in each node to the VFS mechanism representing the new file system resource.

13. The mechanism of claim 12, further comprising:

a plurality of file system objects, each file system object (FSobj) representing a file system resource in a select node;

a plurality of proxy file system objects, each proxy file system object (PxFSobj) used to reference a corresponding FSobj; and the global mount mechanism selecting one of the plurality of nodes as a server node for a new file system resource, the server node generating a FSobj for the new file system resource, linking the FSobj to a corresponding VFS mechanism representing the new file system resource and passing an object reference to the new file system resource to all other nodes, each receiving node generating a proxy file system object (PxFSobj) from the object reference and linking the PxFSobj to a corresponding VFS mechanism representing the new file system resource in the receiving node.

14. The mechanism of claim 13, wherein the global mount mechanism has a capability to unmount a mounted file system resource from the global name space by performing the steps comprising:

locating a same mount point in each node from which the mounted file system resource is unmounted;

concurrently locking the same mount point in each node;

unmounting the mounted file system resource from the same mount point in each node; and unlocking the mount point in each node.

15. The mechanism of claim 14, further comprising:

a plurality of local name spaces, each local name space associated with a particular node and representing a plurality of local file system resources associated with the particular node, each local file system resource representing a plurality of local file resources and including a plurality of local pathnames, each local pathname representing one of the local file resources, each local pathname including one or more local directories organized in a hierarchical structure; and an initialization mechanism having a capability to generate the global name space from one or more of the local name spaces, the initialization mechanism generating the global name space by performing the steps comprising:

enabling a first local directory with a global locking capability, thereby generating the global name space and making the first local directory a global mount point within the global name space; and mounting a local file system resource into the global name space at the global mount point.

16. The mechanism of claim 15, wherein the same directory is the first local directory and wherein the step of enabling includes:

using the first locking mechanism to lock the first local directory in every node of the plurality of nodes to enable the first local directory with the global locking capability.

17. A method for maintaining a global name space in a computing system that has a plurality of nodes interconnected by a communications link, the computing system having a global name space representing a plurality of global file system resources accessible from each node of the plurality of nodes, each global file system resource including a plurality of file resources, the global name space including a plurality of global pathnames with each global pathname representing one of the global file resources, each global pathname including one or more global directories, the global name space distributed in each node, the method comprising the steps of:

providing a first file system resource for mounting in the global name space at a designated first mount point selected from the global directories;

performing a global mount operation such that the first file system resource is mounted in the global name space at the designated mount point on every node of the plurality of nodes, the global mount operation comprising the steps of:

concurrently locking the first designated mount point in each node, wherein the step of concurrently locking comprises locking a respective local lock in every node of the plurality of nodes, each respective local lock being associated with the first designated mount point;

after locking the first designated mount point in every node of the plurality of nodes, mounting the first file system resource at the first designated mount point in every node of the plurality of nodes; and concurrently unlocking the first designated mount point in every node of the plurality of nodes by unlocking the respective local lock at each node.

18. The method of claim 17, further comprising the steps of:

selecting a second file system resource for unmounting from the global name space at a second mount point selected from the global directories;

concurrently locking the second mount point in every node of the plurality of nodes;

unmounting the second file system resource from the second mount point in every node of the plurality of nodes; and unlocking the second mount point in every node of the plurality of nodes.

19. The method of claim 17,
wherein the computing system further comprises a plurality of local name spaces, each local name space representing a plurality of local file system resources associated with one node of the plurality of nodes, each local file system resource representing a plurality of local file resources, each local name space including a plurality of local pathnames, each local pathname representing one of the plurality of local file resources and including one or more local directories;

the method including the steps of:
enabling one the local directories with a global locking capability that enables the one local directory to be locked by every node of the plurality of nodes, thereby making the local directory a global directory in the global name space; and
concurrently mounting one or more of the local file system resources into the global name space at a selected one of the global directories, thereby making the one or more mounted local file system resources global file system resources.

20. The method of claim 19, said step of concurrently mounting further comprising the steps of:
(i) concurrently locking the select global directory in each node;
(ii) mounting a first local file system resource at the select global directory in each said node; and
(iii) concurrently unlocking the select global directory in each node.

21. A computer system for generating a global name space in a distributed computing environment, the system comprising:
a plurality of nodes interconnected by a communications link, each node of the plurality of nodes having a local name space representing a plurality of system resources local to each node, each system resource of the plurality of system resources being represented by a local file resource, the local file resource being represented by a local pathname including one or more local directories; and
a global name space initialization mechanism wherein the mechanism generates the global name space, the global name space initialization mechanism including:
a locking mechanism distributed in every node of the plurality of nodes, the locking mechanism enabling a first local directory with a global locking capability, thereby generating the global name space and making the first local directory a global mount point within the global name space; and
a global mount mechanism for mounting a first local file resource into the global name space at the global mount point.

22. The system of claim 21, wherein
the locking mechanism is associated with the first local directory in every node of the plurality of nodes, the locking mechanism having a capability to lock the first local directory in every node of the plurality of nodes; and
the global mount mechanism uses the locking mechanism to lock the first local directory in every node of the plurality of nodes before mounting the first local file resource at the global mount point.

23. A method for initializing a global name space in a distributed computing environment, the method comprising:
accessing a plurality of nodes interconnected by a communications link, each node of the plurality of nodes having a local name space representing a plurality of system resources local to each node, each system resource of the plurality of system resources being represented by a local file resource, the local file resource being represented by a local pathname including one or more local directories; and
initializing the global name space by:
enabling a first local directory with a global locking capability, distributed over all the nodes in the plurality of node, thereby initializing the global name space and making the first local directory a global mount point within the global name space; and
mounting a first local file resource into the global name space at the global mount point.

24. The method of claim 23, wherein:
the step of enabling the global locking capability includes using a locking mechanism distributed in every node of the plurality of nodes, the locking mechanism being associated with the first local directory in every node of the plurality of nodes, the locking mechanism having a capability to lock the first local directory in every node of the plurality of nodes; and
the step of enabling the first local directory with a global locking capability includes using the locking mechanism to lock the first local directory in every node of the plurality of nodes before the mounting step is performed.

* * * * *